(12) United States Patent
Heinecke et al.

(10) Patent No.: US 10,970,072 B2
(45) Date of Patent: Apr. 6, 2021

(54) SYSTEMS AND METHODS TO TRANSPOSE VECTORS ON-THE-FLY WHILE LOADING FROM MEMORY

(71) Applicant: Intel Corporation, Santa Clara, CA (US)

(72) Inventors: Alexander F. Heinecke, San Jose, CA (US); Evangelos Georganas, San Mateo, CA (US); Christopher J. Hughes, Santa Clara, CA (US); Raanan Sade, Kibutz Sarid (IL); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/231,050

(22) Filed: Dec. 21, 2018

(65) Prior Publication Data
US 2020/0201640 A1    Jun. 25, 2020

(51) Int. Cl.
*G06F 9/30*    (2018.01)
(52) U.S. Cl.
CPC ...... *G06F 9/30043* (2013.01); *G06F 9/30032* (2013.01); *G06F 9/30036* (2013.01)
(58) Field of Classification Search
CPC ............ G06F 9/30043; G06F 9/30032; G06F 9/30036
See application file for complete search history.

(56) References Cited

U.S. PATENT DOCUMENTS

| 2012/0011348 | A1* | 1/2012 | Eichenberger ...... | G06F 9/30014 712/222 |
| 2014/0331032 | A1* | 11/2014 | Ahmed ............... | G06F 9/30032 712/225 |
| 2017/0031865 | A1* | 2/2017 | Eyole .................. | G06F 9/30043 |
| 2017/0177353 | A1 | 6/2017 | Ould-Ahmed-Vall | |
| 2017/0192784 | A1* | 7/2017 | Ould-Ahmed-Vall ...... | G06F 9/30036 |

OTHER PUBLICATIONS

European Search Report and Search Opinion, EP App. No. 19203199.5, dated May 6, 2020, 9 pages.
Office Action, EP App. No. 19203199.5 dated Feb. 5, 2021, 5 pages.

* cited by examiner

*Primary Examiner* — Jyoti Mehta
(74) *Attorney, Agent, or Firm* — Nicholson De Vos Webster & Elliott LLP

(57) ABSTRACT

Disclosed embodiments relate to transposing vectors while loading from memory. In one example, a processor includes a register file, a memory interface, fetch circuitry to fetch an instruction, decode circuitry to decode the fetched instruction having fields to specify an opcode, a destination vector register, and a source vector having N groups of elements, N being a positive integer, the opcode to indicate the processor is to fetch the source vector, generate write data comprising one or more N-tuples, each N-tuple comprising corresponding elements from each of the N groups of elements, and write the write data to the destination vector register, and execution circuitry to execute the decoded instruction as per the opcode, the execution circuitry has a shuffle pipeline disposed between the memory and the register file, the shuffle pipeline to fetch, decode, and execute further instances of the instruction at one instruction per clock cycle.

15 Claims, 28 Drawing Sheets

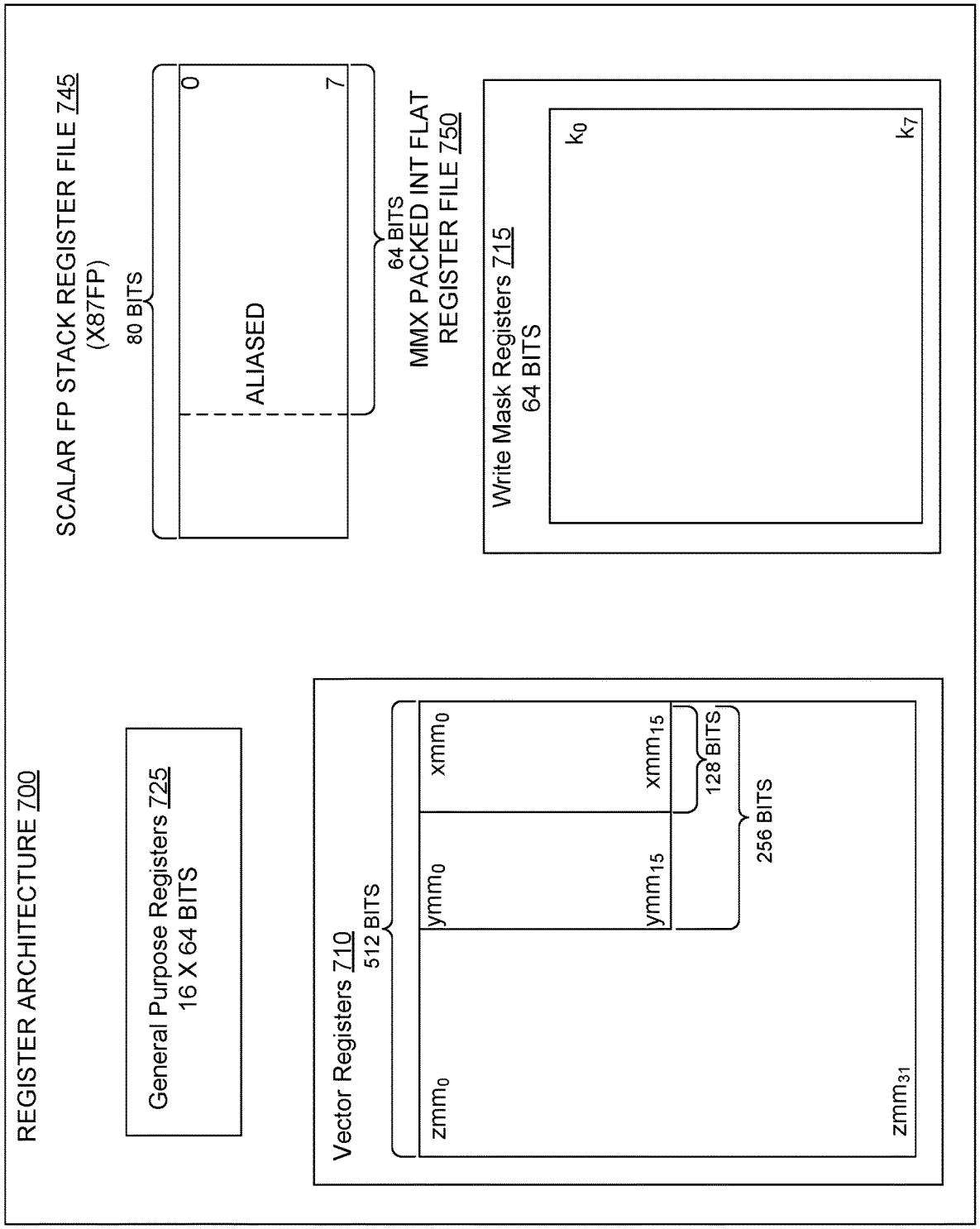

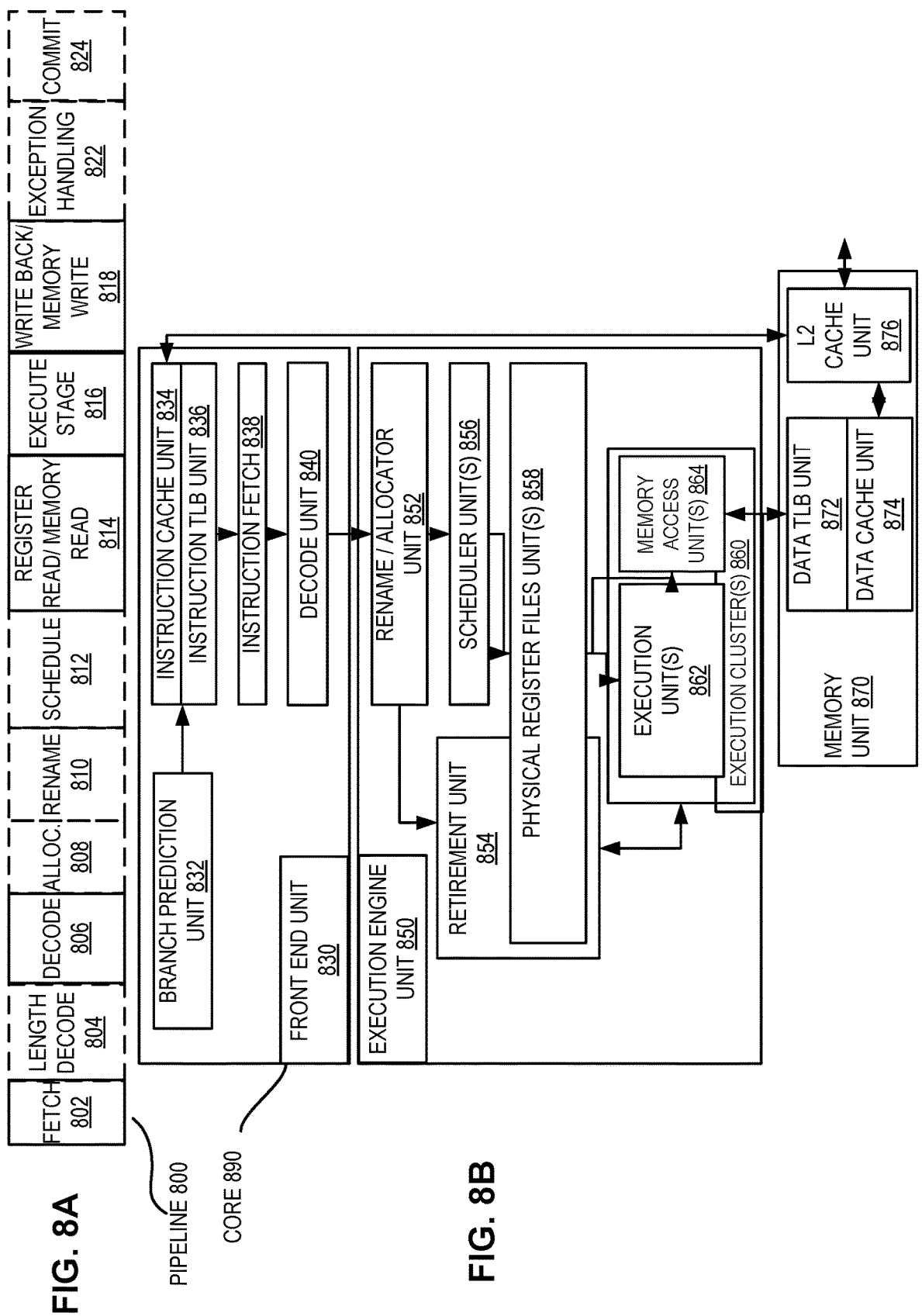

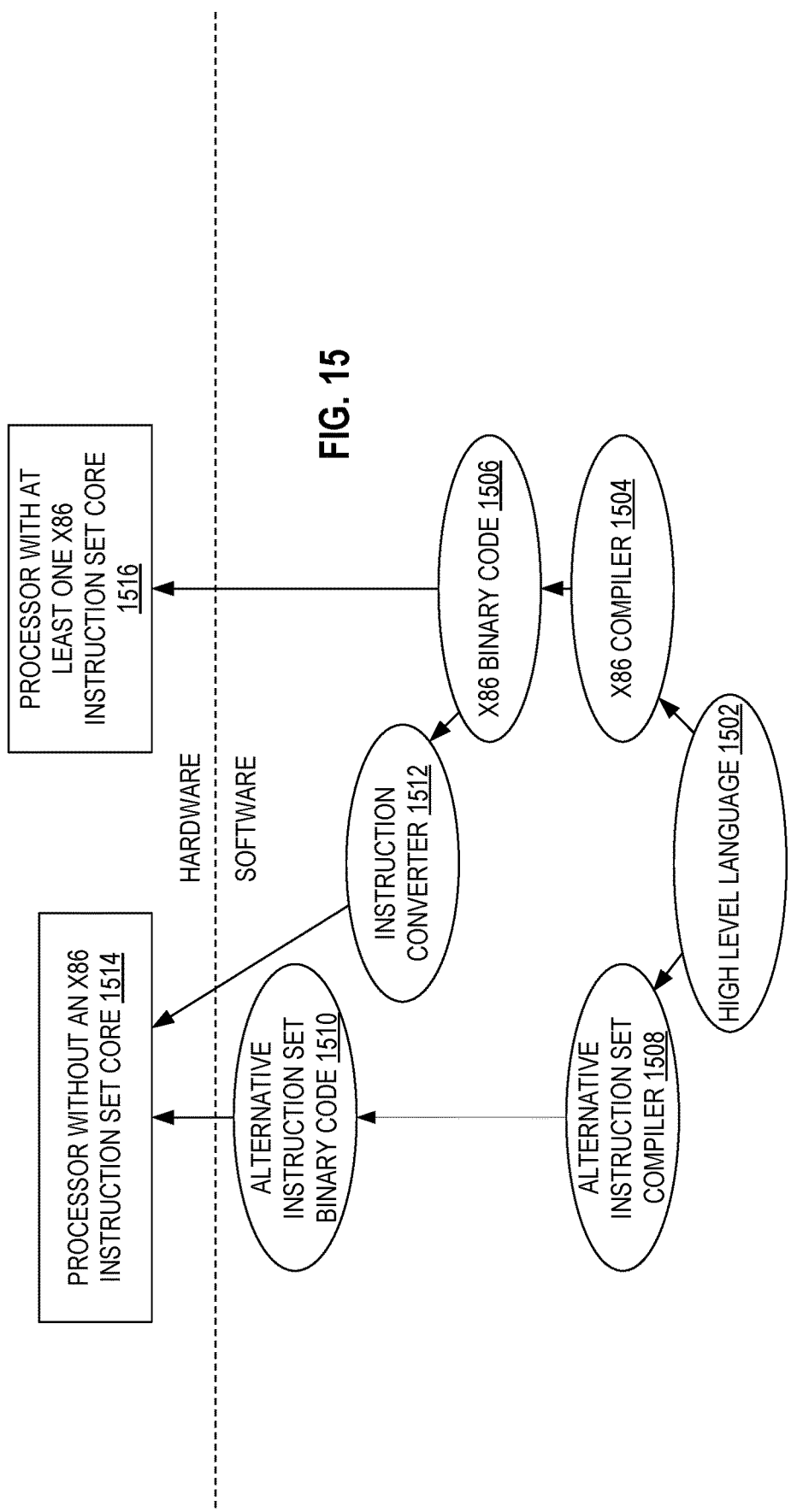

SYSTEMS AND METHODS TO TRANSPOSE VECTORS ON-THE-FLY WHILE LOADING FROM MEMORY

FIELD OF THE INVENTION

The field of invention relates generally to computer processor architecture, and, more specifically, to systems and methods to transpose vectors while loading from memory.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

N-tuples are frequently used in the context of computing applications such as speech recognition, machine learning, and deep learning. As used herein, an N-tuple is an ordered sequence of N integer elements. There is no upper limit on N, and N-tuples with N equaling 1, 2, 3, 4, or 5 may be referred to as monads, duads, triads, tetrads, and pentads, respectively.

A group of M instances of an N-tuple may be represented as a packed data vector, either interleaving the elements of each of the M instances, one after another, or segregating the elements of the M instances into N groups, each group having M elements.

Applications often need to transpose, by permuting elements of the packed data vector, a group of M instances of an N-tuple from the segregated representation to the interleaved representation. Sometimes, applications need to transpose one, two, or more of the M instances of the N-tuple from the segregated representation to the interleaved representation, and broadcast the one, two, or more N-tuples across an entire vector register. Although such transposes and broadcasts could be realized using existing vector instructions, doing so is often slow, results in a large code size, and frequently requires complex software tuning.

BRIEF DESCRIPTION OF THE DRAWINGS

FIG. 5A is a block diagram illustrating a generic vector friendly instruction format and class A instruction templates thereof according to some embodiments of the invention;

FIG. 5B is a block diagram illustrating the generic vector friendly instruction format and class B instruction templates thereof according to some embodiments of the invention;

FIG. 7 is a block diagram of a register architecture according to one embodiment;

FIG. 8A is a block diagram illustrating both an exemplary in-order pipeline and an exemplary register renaming, out-of-order issue/execution pipeline according to some embodiments;

FIG. 8B is a block diagram illustrating both an exemplary embodiment of an in-order architecture core and an exemplary register renaming, out-of-order issue/execution architecture core to be included in a processor according to some embodiments;

FIG. 9A is a block diagram of a single processor core, along with its connection to the on-die interconnect network and with its local subset of the Level 2 (L2) cache, according to some embodiments;

FIG. 9B is an expanded view of part of the processor core in FIG. 9A according to some embodiments;

FIG. 11 shown a block diagram of a system in accordance with some embodiments;

FIG. 12 is a block diagram of a first more specific exemplary system in accordance with some embodiment;

FIG. 13 is a block diagram of a second more specific exemplary system in accordance with some embodiments;

FIG. 14 is a block diagram of a System-on-a-Chip (SoC) in accordance with some embodiments; and FIG. 15 is a block diagram contrasting the use of a software instruction converter to convert binary instructions in a source instruction set to binary instructions in a target instruction set according to some embodiments.

DETAILED DESCRIPTION OF THE EMBODIMENTS

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

As mentioned above, n-tuples are N ordered each set having M integers. As used herein n-tuple vectors may be represented in memory by a vector containing N groups of elements, each group having M elements. The N groups of elements may either interleave the elements of the n-tuple vector or segregate the elements according to their group. Disclosed herein are a family of instructions that transform from the segregated format to the interleaved format, a transformation required by machine learning and training applications in several stages of the backward propagation pass. Machine learning and training applications are therefore sensitive to the transposes' performance and stand to benefit from the disclosed instructions.

Although transposes could be realized using existing vector instructions, doing so is often slow, often results in a large code size, and frequently requires complex software tuning.

Accordingly, systems and methods can take advantage of embodiments disclosed herein describe a shuffle network that permutes vector data received from memory before placing the permuted vector data into a vector register file. In some embodiments, the shuffle network serves to broadcast a portion of the permuted vector over the entire width of the destination vector register. Moreover, by placing the shuffle network between a memory read port and the register file, disclosed embodiments achieve "on the fly" transformation, processing instructions at a rate of one instruction per cycle and allowing applications to benefit from the transformation essentially "for free," without incurring any additional latency or performance penalty.

Figure 1A:
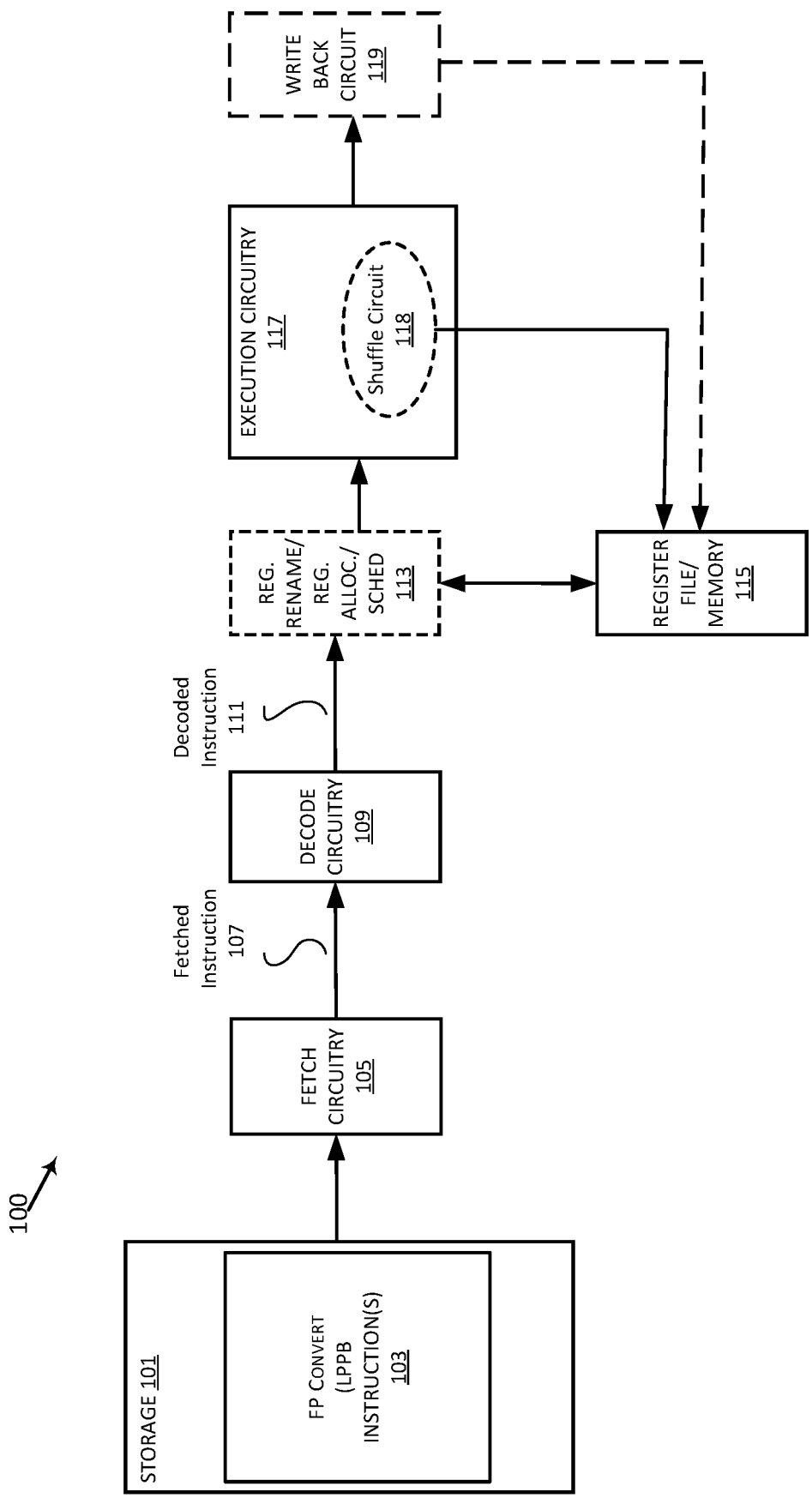
FIG. 1A is a block diagram illustrating processing components for executing a Load Permute with Possible Broadcast (LPPB) instruction, according to an embodiment.

FIG. 1A is a block diagram illustrating processing components for executing a load permute or load permute and broadcast instruction, according to some embodiments. As illustrated, system 100 includes storage 101 to store Load Permute with Possible Broadcast (LPPB) instruction(s) 103 to be executed. In some embodiments, computing system 100 is a SIMD processor to concurrently process multiple elements of packed-data vectors, such as matrices.

In operation, the Load Permute with Possible Broadcast (LPPB) instruction(s) 103 is fetched from storage 101 by fetch circuitry 105. The fetched Load Permute with Possible Broadcast (LPPB) instruction 107 is decoded by decode circuitry 109. The Load Permute with Possible Broadcast (LPPB) instruction format, which is further illustrated and described at least with respect to FIGS. 4A-B, 5A-B, and 6A-D, has fields (not shown here) to specify an opcode, a destination vector register, and a memory location of a source vector having N groups of elements, N being a positive integer. The opcode is to indicate the processor is to fetch the source vector, generate write data comprising one or more N-tuples, each N-tuple comprising corresponding elements from each of the N groups of elements, and write the generated write data to the destination vector register.

In some embodiments, this decoding includes generating a plurality of micro-operations to be performed by execution circuitry (such as execution circuitry 117). Decode circuitry 109 also decodes instruction suffixes and prefixes (if used). In some embodiments, execution circuitry 117 includes shuffle circuit 118, which is optional insofar as it may be included outside of, or be incorporated into, execution circuitry 117.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded Load Permute with Possible Broadcast (LPPB) instruction 111 for execution on execution circuitry 117 out of an instruction pool (e.g., using a reservation station in some embodiments).

Computing system 100 further includes a register file and memory 115, which are coupled to register rename/register allocation/scheduling circuit 113, execution circuit 117, shuffle circuit 118, and write back circuit 119.

Register rename/register allocation/scheduling circuit 113 and write back circuit 119 are optional, as indicated by their dashed borders, insofar as they represent operations that may occur at a different time, or not at all. Shuffle circuit 118 is also shown with a dashed border, signifying that it may be implemented outside of execution circuit 117, or be incorporated in datapath and control circuitry of execution circuit 117.

Execution circuitry 117 is further described and illustrated below, at least with respect to FIGS. 1B, 2A-I, 3, 8A-B and 9A-B.

Figure 1B:
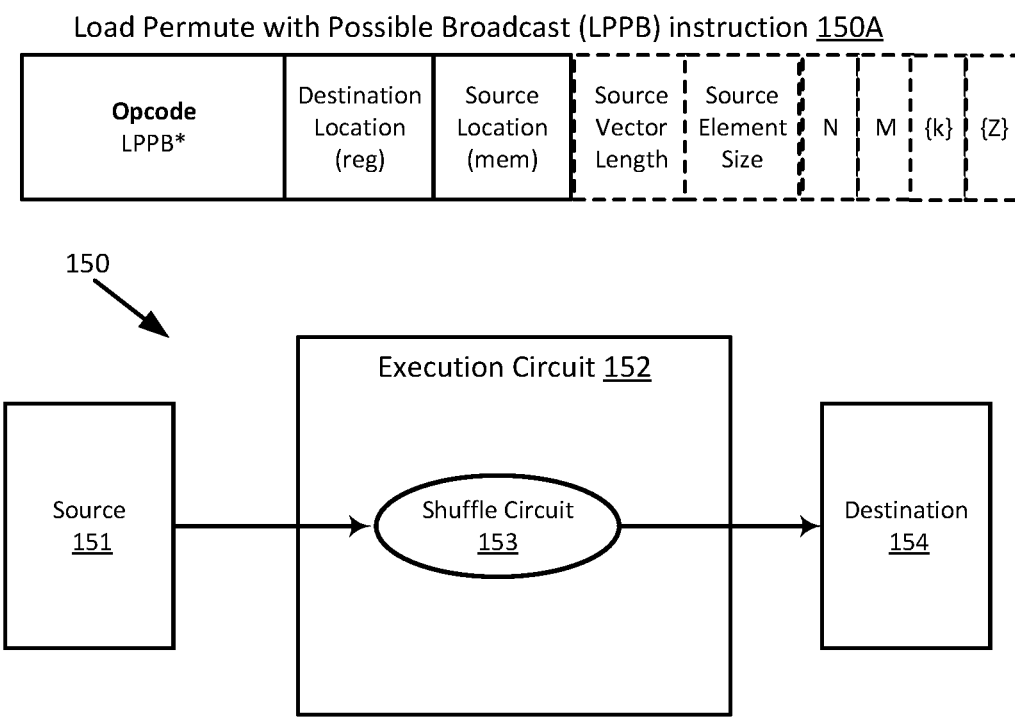
FIG. 1B is a block diagram illustrating execution of a Load Permute with Possible Broadcast (LPPB) instruction, according to an embodiment.

FIG. 1B is a block diagram illustrating execution of a Load Permute with Possible Broadcast (LPPB) instruction, according to an embodiment. As shown, LPPB Instruction 150A includes fields to specify an opcode ("LPPB"), a destination vector register, and a memory location of a source vector comprising N groups of elements, N being a positive integer, the opcode to indicate the processor is to fetch the source vector, generate write data comprising one or more N-tuples, each N-tuple comprising corresponding elements from each of the N groups of elements, and write the generated write data to the destination vector register.

LPPB instruction 150A is to be executed by system 150, which includes the source 151 (in a memory), the destination 154 (in a vector register of a register file), and execution circuitry 152, which includes shuffle circuit 153.

The opcode mnemonic here includes an asterisk (*), which is to indicate that the opcode can include various optional modifiers that could otherwise be specified as instruction fields, which here include a source vector length, a source data format, a number of groups, N, a number of elements per group, M, a multibit mask, {k}, with each bit to control whether to allow modification of a corresponding destination vector element, or if that corresponding element is to be masked. The instruction may also optionally specify a {z} parameter to control whether masked destination vector elements are to be zeroed or merged.

LPPB Instruction Throughput of 1 Cycle per Instruction

Figure 2A:
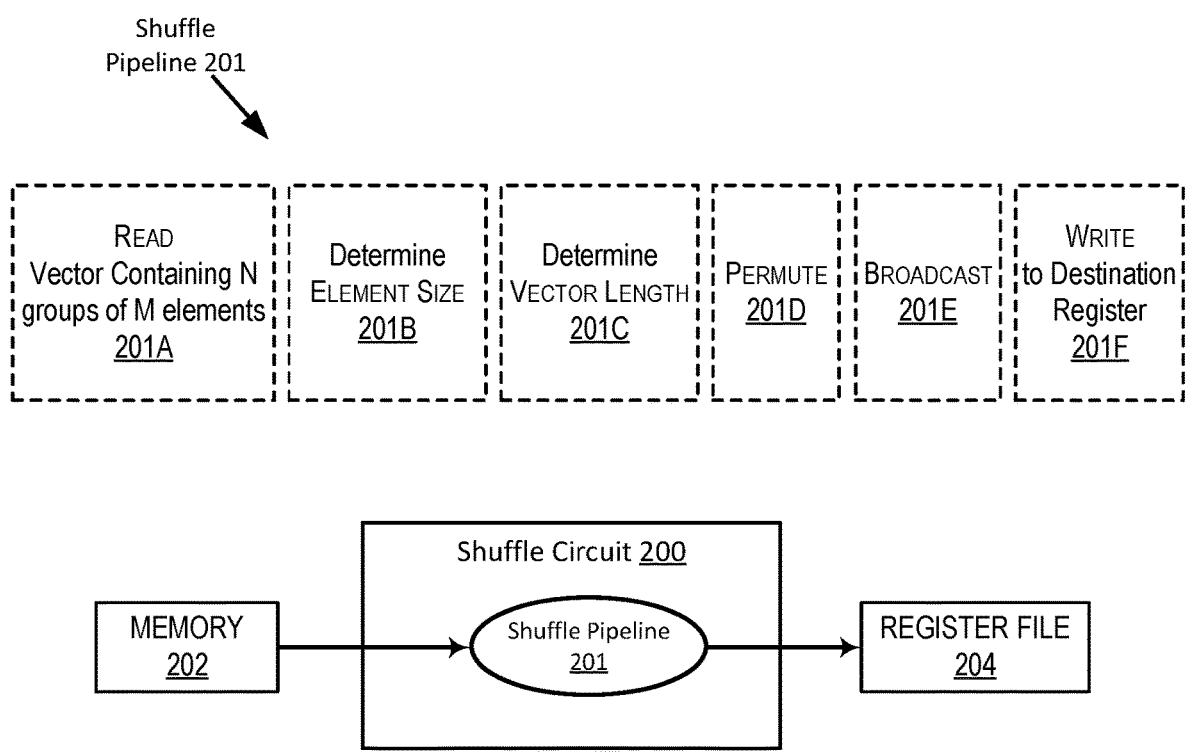
FIG. 2A is a block diagram illustrating a shuffle circuit with a throughput of one cycle per instruction, according to an embodiment.

FIG. 2A is a block diagram illustrating a shuffle pipeline with a throughput of one instruction per cycle, according to an embodiment. As shown, shuffle circuit 200, which includes shuffle pipeline 201, an expanded version of which is also illustrated in FIG. 2A, is to receive packed vector data containing N groups, each group having M elements, from memory 202. For example, memory 202 may be a first-level data cache having a read port to output a cache line, which in some embodiments consists of 64 bytes of data.

In operation, shuffle circuit 200 is to generate write data by permuting and possibly broadcasting one or more N-tuples to a destination vector. Such operations, depending on the performance capabilities of the execution circuitry, may occur in one clock cycle. But, in some embodiments, the shuffle circuit takes several cycles to perform those operations and uses shuffle pipeline 201, disposed between memory 202 and register file 204, to stage performance of those operations so as to allow one new instruction to be received every cycle. As shown, shuffle pipeline 201 includes a first stage 201A to read a vector containing N groups of elements from memory, for example from a read port of a data cache. Shuffle pipeline 201 determines an element size and a vector length at the next two illustrated stages 201B and 201C. Such determinations can be made in any of several ways, including: as instruction fields, or as opcode prefixes/suffixes that indicate those dimensions, as illustrated and described with respect to FIGS. 4A-4B, 5A-5B, and 6A-6D. The element size and vector length can also be indicated by other than the instruction itself; for example, software may program model-specific registers (MSRs) indicating those dimensions, or those dimensions may even take on architectural default values. Permutation and broadcasting are conducted at the next stages 201D and 201E. Lastly, as illustrated, the shuffle pipeline at stage 201F writes the generated write data to the destination vector register.

In some embodiments, shuffle pipeline 201 is purposely placed between a memory read port and register file 204. That way, the shuffle network can intercept incoming vector data from memory and perform its permutation and broadcast operations "on the fly," before writing the generated write data to the destination vector register. In some embodiments, shuffle pipeline 201 takes multiple cycles to perform its permutation and broadcast functions, but pipelines execution of those instructions through an execution pipeline that enables a new PLLB instruction to be received, decoded, and executed every cycle.

It should be noted that shuffle pipeline stages 201A-201F are shown with dashed borders to stress their optional nature. Each of pipeline stages 201A-201F may be combined with other stages. Disclosed embodiments do not place any requirements or limitations on the length of the shuffle pipeline, so long as it can achieve and maintain a throughput of one instruction per cycle.

The one-cycle throughput, or execution rate of one instruction per cycle provides improved performance over processors that lack the disclosed embodiments and must instead perform permutation and broadcast functions as separate instructions. In light of the supported throughput of one instruction per clock cycle, disclosed embodiments provide permutation and broadcast functionally essentially "for free," beneficially providing the functionality without incurring any performance penalty or additional code size.

Figure 2B:
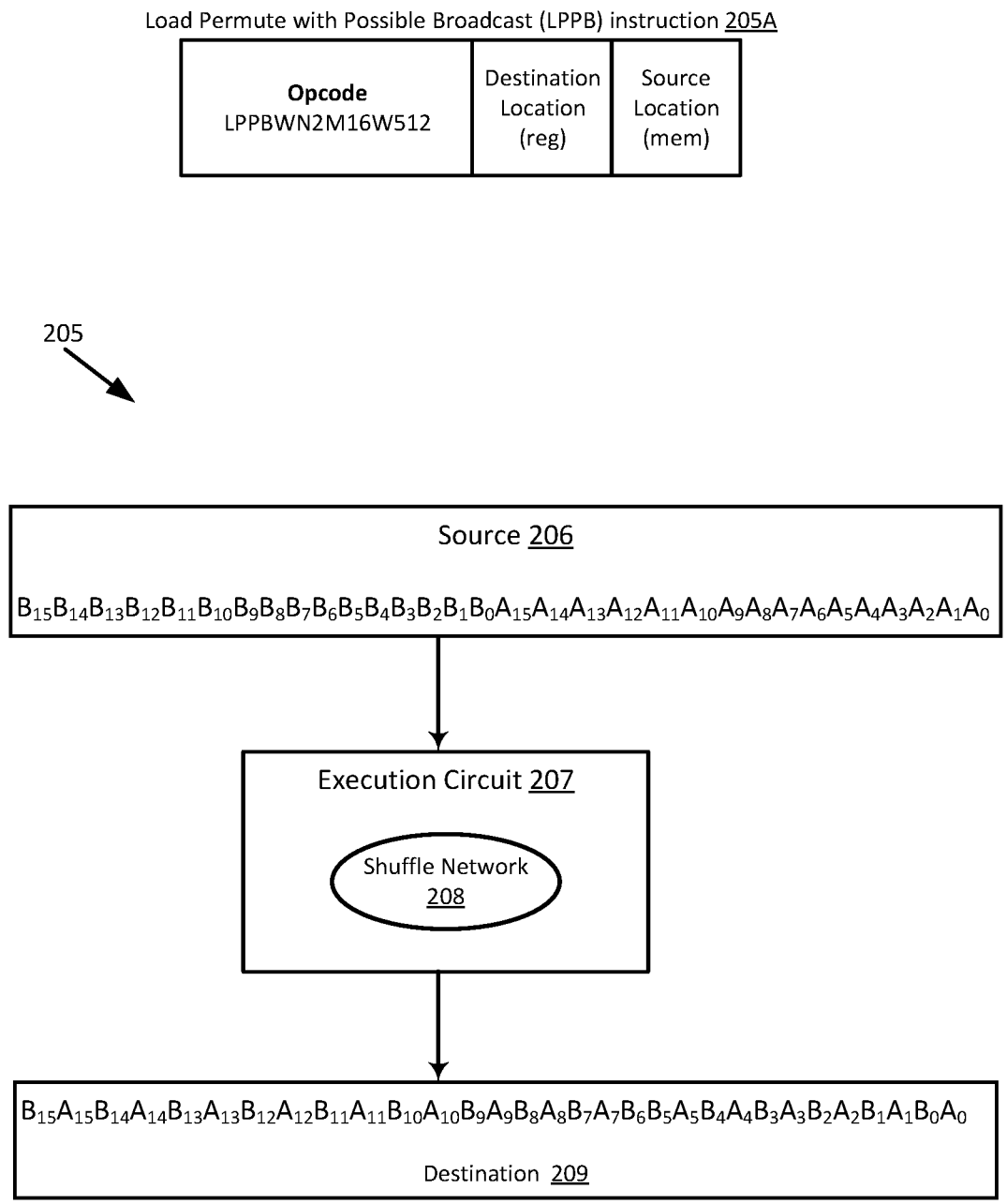
FIG. 2B is a block diagram illustrating execution of a Load Permute with Possible Broadcast (LPPB) instruction, according to an embodiment.

FIG. 2B is a block diagram illustrating execution of a Load Permute with Possible Broadcast (LPPB) instruction, according to an embodiment. As shown, Load Permute with Possible Broadcast (LPPB) instruction 205A includes fields to specify an opcode (such as LPPBWN2M16W512), a destination vector register, and a memory location of a source vector comprising N groups of elements, N being a positive integer.

Here, the opcode is to indicate the processor is to fetch the source vector, generate write data comprising one or more N-tuples, each N-tuple comprising corresponding elements from each of the N groups of elements and write the generated write data to the destination vector register. The instruction 205A is to be executed by system 205, which includes the source 206, the destination vector register 209, and execution circuitry 207, which includes shuffle network 208.

Here, the opcode mnemonic (LPPBWN2M16W512) includes suffixes to indicate the instruction behavior. "LPPBW" indicates that the processor is to perform a permute, without any broadcast, of 16 ("M16") elements of each of 2 groups ("N2") of source elements to corresponding destination vector register 209. "W" indicates that the elements of the source vector are 16-bit, or Word-sized elements. Accordingly, the source 206 is shown including two groups of elements, A and B, each of which contains 16 elements. "W512" indicates that the destination vector register has 512 bits, which can hold N×M elements (N=2× M=16×16 bits). In other embodiments, the width of the destination vector register may be specified as being one of 32 bits, 64 bits, 128 bits, 256 bits, and 1,024 bits. In other embodiments, the elements can have any of various different sizes, including any one of 2 bits, 4 bits, 8 bits, 32 bits, 64 bits, and 128 bits.

The format of Load Permute with Possible Broadcast (LPPB) instruction 205A is further illustrated and described at least with respect to FIGS. 4A-B, 5A-B, and 6A-D.

System 205 and execution circuit 207 are further illustrated and described at least with respect to FIGS. 1, 2A, 2C-2K, 3, 8A,B, and 9A,B.

Figure 2C:
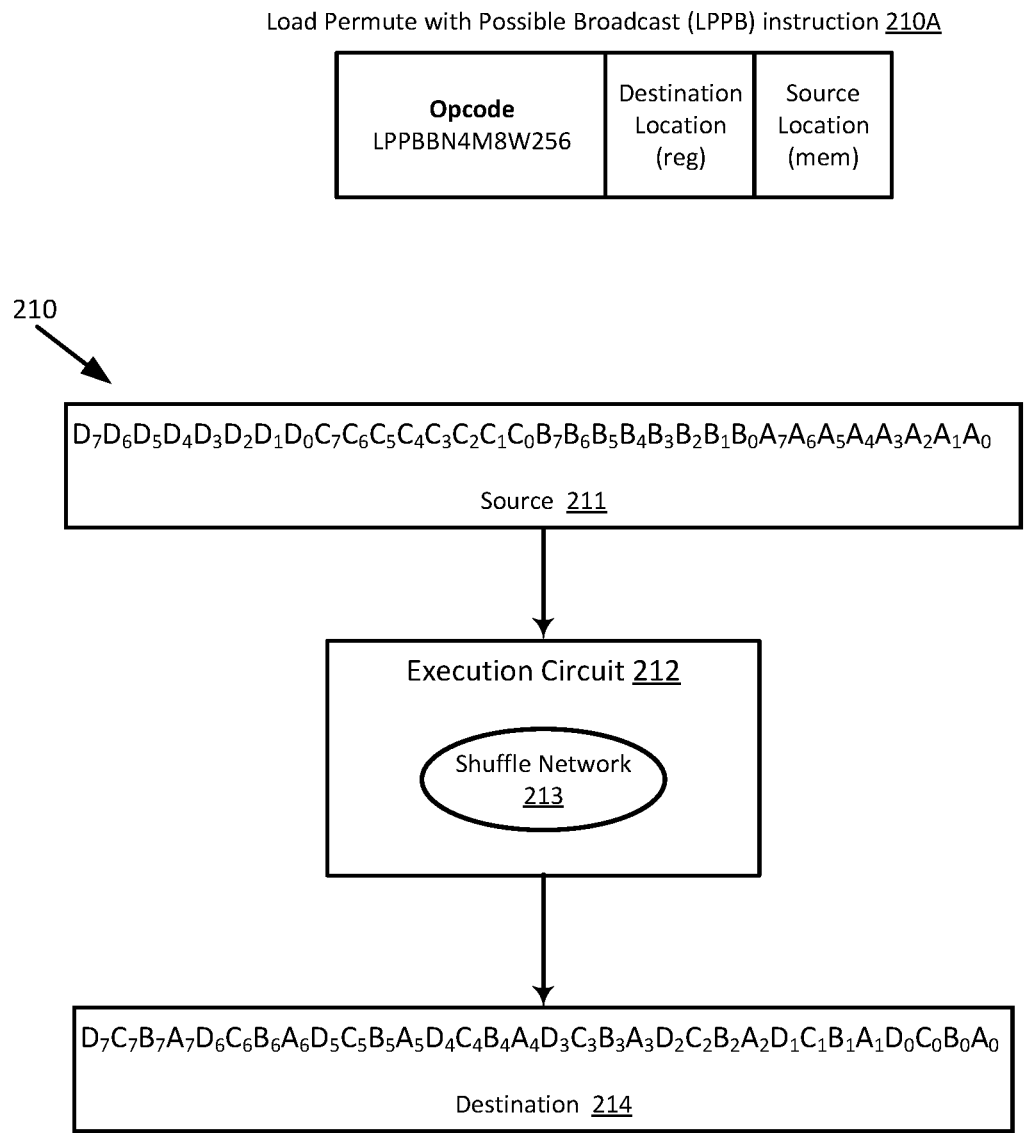
FIG. 2C is a block diagram illustrating execution of a Load Permute with Possible Broadcast (LPPB) instruction, according to an embodiment.

FIG. 2C is a block diagram illustrating execution of a Load Permute with Possible Broadcast (LPPB) instruction, according to an embodiment. As shown, Load Permute with Possible Broadcast (LPPB) Instruction 210A, which includes fields to specify an opcode (such as LPPBBN4M8W256), a destination vector register, and a memory location of a source vector comprising N groups of elements, N being a positive integer. Here, the opcode indicates the processor is to fetch the source vector, generate write data comprising one or more N-tuples, each N-tuple comprising corresponding elements from each of the N groups of elements, and write the generated write data to the destination vector register. Here, there is no broadcasting required, as M=32 N-tuples are to be generated. The opcode further indicates the processor is to generate and write M tuples to corresponding elements of the destination vector register, each of the M tuples to comprise N corresponding elements of the N groups of elements. Instruction 210A is to be executed by system 210, which includes the source 211, the execution circuit 212, which includes shuffle network 213, and the destination vector register, 214.

Here, the opcode mnemonic (LPPBBN4M8W256) includes suffixes to indicate the instruction behavior. "LPPBB," without the "cast" modifier, indicates that the processor is to perform a permute but no broadcast of each of the M=8 elements of each of the N=4 groups of elements to corresponding destination vector register 214. "B" indicates that the elements of the source vector are 8-bit elements. Accordingly, the source 211 is shown including four groups of elements, A, B, C and D, each of which contains 8 elements. "W256" indicates that the destination vector register has 256 bits (N=4×M=8×8 bits). In other embodiments, the width of the destination vector register may be specified as being one of 32 bits, 64 bits, 128 bits, 512 bits, and 1,024 bits. In other embodiments, the elements can have any of various different sizes, including any one of 2 bits, 4 bits, 16 bits, 32 bits, 64 bits, and 128 bits.

In operation, execution circuit 212, which includes shuffle network 213, is to execute multiple instances of the LPPB instruction 210A at a rate of one instruction per cycle.

The format of Load Permute with Possible Broadcast (LPPB) instruction 210A is further illustrated and described at least with respect to FIGS. 4A-B, 5A-B, and 6A-D.

System 210 and execution circuit 212 are further illustrated and described at least with respect to FIGS. 1, 2A-2B, 2D-2K, 3, 8A,B, and 9A,B.

Figure 2D:
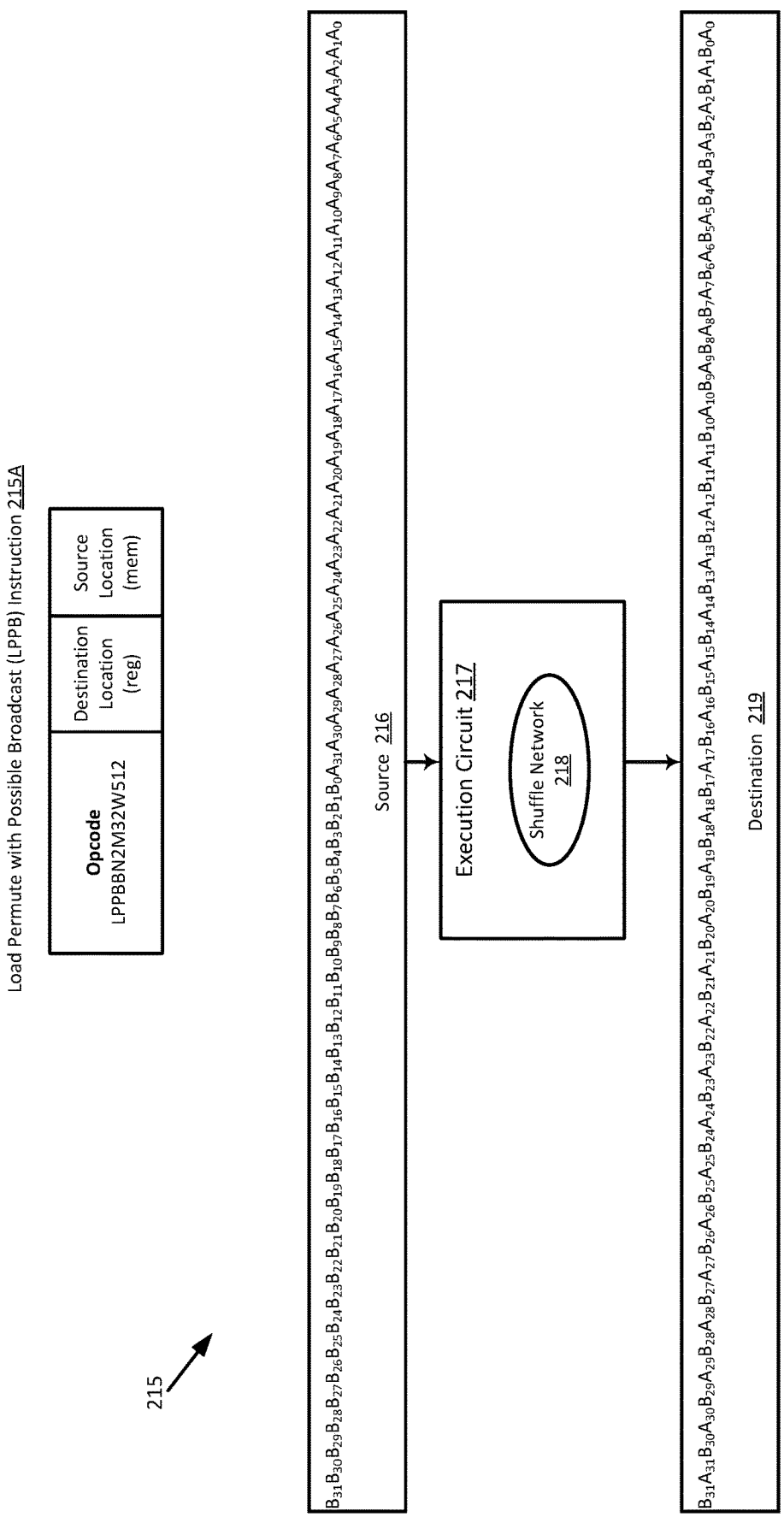
FIG. 2D is a block diagram illustrating execution of a Load Permute with Possible Broadcast (LPPB) instruction, according to an embodiment.

FIG. 2D is a block diagram illustrating execution of a Load Permute with Possible Broadcast (LPPB) instruction, according to an embodiment. As shown, Load Permute with Possible Broadcast (LPPB) Instruction 215A, which includes fields to specify an opcode (such as LPPBBN2M32W512), a destination vector register, and a memory location of a source vector comprising N groups of elements, N being a positive integer. The opcode indicates the processor is to fetch the source vector, generate write data comprising one or more N-tuples, each N-tuple comprising corresponding elements from each of the N groups of elements and write the generated write data to the destination vector register. Here, there is no broadcasting required, as M=32 N-tuples are to be generated. Here, the opcode further indicates the processor is to generate and write M tuples to corresponding elements of the destination register, each of the M tuples to comprise N corresponding elements of the N groups of elements. Instruction 215A is to be executed by system 215, which includes the source 216, the execution circuit 217, which includes shuffle network 218, and the destination vector register, 219.

Here, the opcode mnemonic (LPPBBN2M32W512) includes suffixes to indicate the instruction behavior. "LPPB," without the "cast" modifier, indicates that the processor is to perform a permute but no broadcast of each of the M=32 elements of each of the 2 ("N2") groups of elements to corresponding destination vector register 219. "B" indicates that the elements of the source vector are 8-bit elements. Accordingly, the source 216 is shown including two groups of elements, A and B, each of which contains 32 elements. "W512" indicates that the destination vector register has 512 bits (N=2×M=32×8 bits). In other embodiments, the width of the destination vector register may be specified as being one of 32 bits, 64 bits, 128 bits, 256 bits, and 1,024 bits. In other embodiments, the elements can have any of various different sizes, including any one of 2 bits, 4 bits, 16 bits, 32 bits, 64 bits, and 128 bits.

The format of Load Permute with Possible Broadcast (LPPB) instruction 215A is further illustrated and described at least with respect to FIGS. 4A-B, 5A-B, and 6A-D.

System 215 and execution circuit 217 are further illustrated and described at least with respect to FIGS. 1, 2A-2C, 2E-2K, 3, 8A,B, and 9A,B.

Figure 2E:
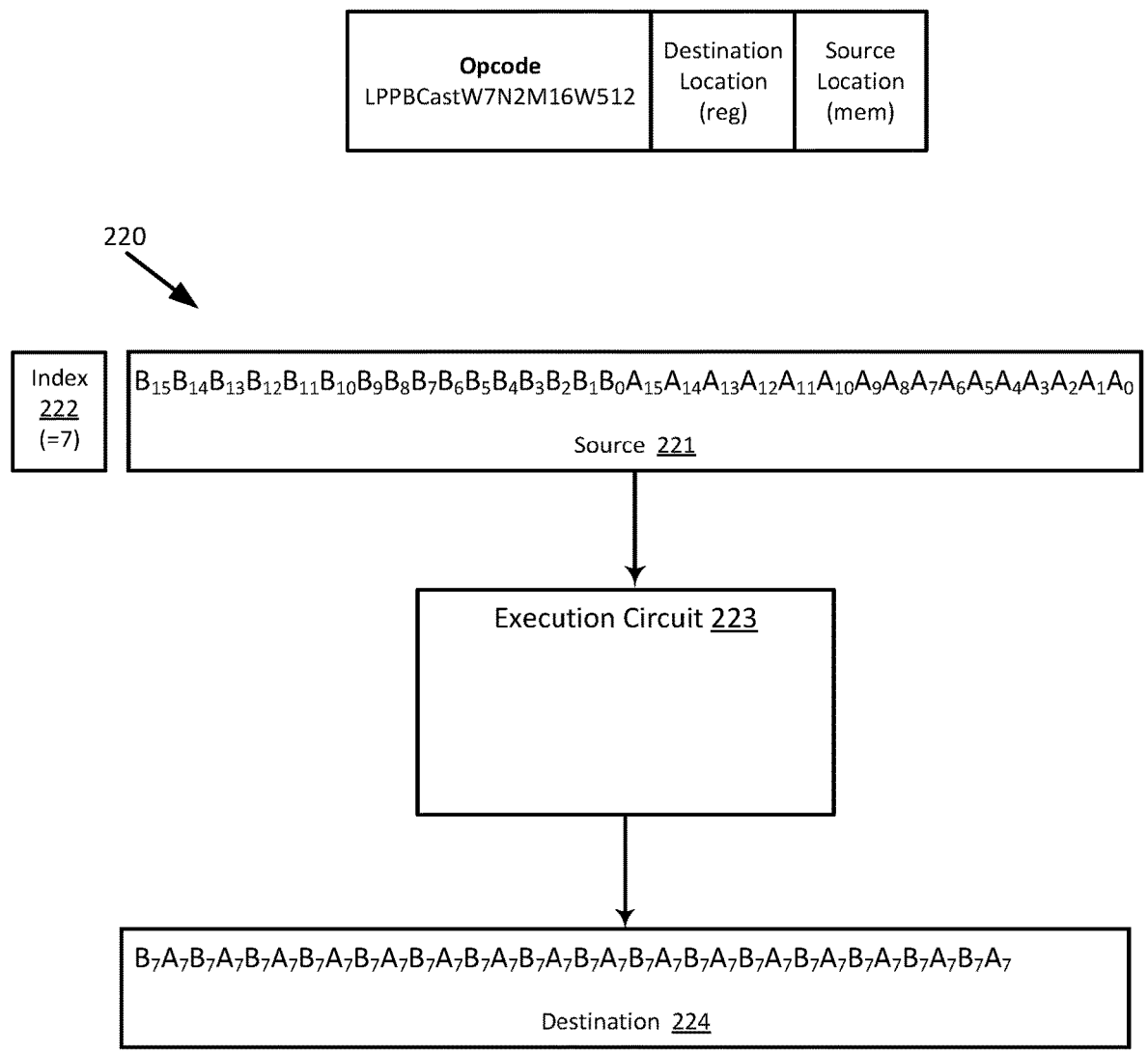
FIG. 2E is a block diagram illustrating execution of a Load Broadcast instruction, according to an embodiment.

FIG. 2E is a block diagram illustrating execution of a Load Broadcast instruction, according to an embodiment. As shown, Load Permute with Possible Broadcast (LPPB) Instruction 220A includes fields to specify an opcode (such as LPPBCastW7N2M16W512), a destination vector register, and a memory location of a source vector comprising N groups of elements, N being a positive integer. The opcode (LPPBCastW7N2M16W512) is to indicate the processor is to fetch the source vector, generate write data comprising one or more N-tuples, each N-tuple comprising corresponding elements from each of the N groups of elements, and write the generated write data to the destination vector register. Here, the opcode further indicates the generated write data is to comprise a single tuple generated based on a selected element ("W7") of the N source vectors, the generated single tuple to be broadcasted to the entire width of the destination vector register. The instruction 220A is to be executed by system 220, which includes the source 221, the specified index 222, which here is set to 7, the destination vector register 224 and execution circuitry 223.

Here, the opcode mnemonic (LPPBCastW7N2M16W512) includes suffixes to indicate the instruction behavior. "LPPBCastW7" indicates that the processor is to perform a permute as well as a broadcast of element 7 of each of the 2 ("N2") groups of 16 ("M16") elements to corresponding destination vector register 224. "W" indicates that the elements of the source vector are 16-bit, or Word-sized elements. Accordingly, the source 221 is shown including two groups of elements, A and B, each of which contains 16 elements. "W512" indicates that the destination vector register has 512 bits, which can hold N×M elements (N=2×M=16×16 bits). In other embodiments, the width of the destination vector register may be specified as being one of 32 bits, 64 bits, 128 bits, 256 bits, and 1,024 bits. In other embodiments, the elements can have any of various different sizes, including any one of 2 bits, 4 bits, 8 bits, 32 bits, 64 bits, and 128 bits.

The format of Load Permute with Possible Broadcast (LPPB) instruction 220A is further illustrated and described at least with respect to FIGS. 4A-B, 5A-B, and 6A-D.

System 220 and execution circuit 223 are further illustrated and described at least with respect to FIGS. 1, 2A-2D, 2F-2K, 3, 8A,B, and 9A,B.

Figure 2F:
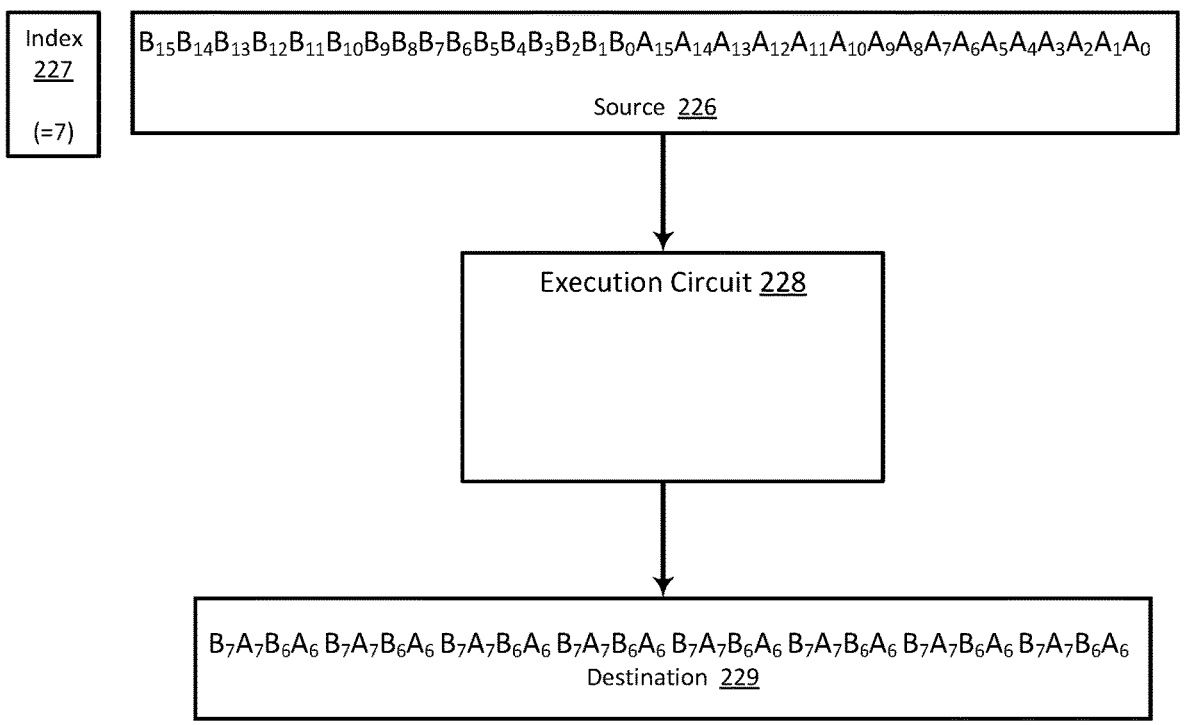
FIG. 2F is a block diagram illustrating execution of a Load Broadcast instruction, according to an embodiment.

FIG. 2F is a block diagram illustrating execution of a Load Broadcast instruction, according to an embodiment. As shown, Load Permute with Possible Broadcast (LPPB) Instruction 225A, which includes fields to specify an opcode (such as LPPBDualCastWN2M16W512), a destination vector register, a memory location of a source vector comprising N groups of elements, N being a positive integer, and an index to broadcast (set to 7). Here, the opcode indicates the processor is to fetch the source vector, then generate and broadcast two N-tuples corresponding to two of the M elements of the source vector to the entire width of the destination vector register 229. Instruction 225A is to be executed by system 225, which includes the source 226, the specified index 227, the destination vector register 229, and execution circuitry 228.

Here, the opcode mnemonic (LPPBDualCastWN2M16W512) includes suffixes to indicate the instruction behavior. "LPPBDualCast" indicates that the processor is to perform a permute as well as a broadcast of 2 selected elements of each of the 2 ("N2") groups of elements to corresponding destination vector register 229. "W" indicates that the elements of the source vector are 16-bit, or Word-sized elements. Accordingly, the source 226 is shown including two groups of elements, A and B, each of which contains 16 elements. "W512" indicates that the destination vector register has 512 bits (N=2× M=16×16 bits). In other embodiments, the width of the destination vector register may be specified as being one of 32 bits, 64 bits, 128 bits, 256 bits, and 1,024 bits. In other embodiments, the elements can have any of various different sizes, including any one of 2 bits, 4 bits, 8 bits, 16 bits, 32 bits, 64 bits, and 128 bits.

The format of Load Permute with Possible Broadcast (LPPB) instruction 225A is further illustrated and described at least with respect to FIGS. 4A-B, 5A-B, and 6A-D.

System 225 and execution circuit 228 are further illustrated and described at least with respect to FIGS. 1, 2A-2E, 2G-2K, 3, 8A,B, and 9A,B.

Figure 2G:
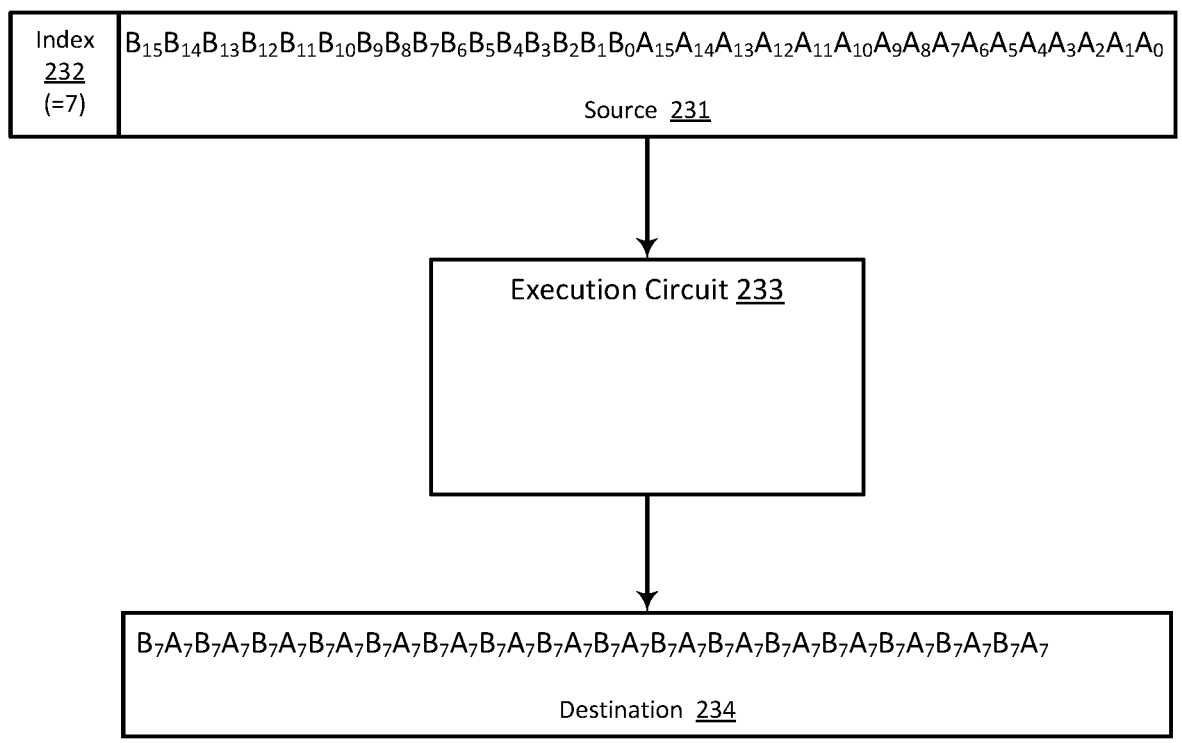
FIG. 2G is a block diagram illustrating execution of a Load Broadcast instruction, according to an embodiment.

FIG. 2G is a block diagram illustrating execution of a Load Broadcast instruction, according to an embodiment. As shown, Load Permute with Possible Broadcast (LPPB) Instruction 230A, which includes fields to specify an opcode (such as LPPBCastWN2M16W512), a destination vector register, a memory location of a source vector comprising N groups of elements, N being a positive integer, and an index to broadcast (=7). Here, the opcode is to indicate the processor is to fetch the source vector, generate write data comprising one or more N-tuples, each N-tuple comprising corresponding elements from each of the N groups of elements, and write the generated write data to the destination vector register. The instruction 230A is to be executed by system 230, which includes the source 231, the specified index to select 232, which here is set to 8, the destination vector register 234, and execution circuitry 233.

Here, the opcode mnemonic (LPPBCastWN2M16W512) includes suffixes to indicate the instruction behavior. "LPPBCast" indicates that the processor is to perform a permute as well as a broadcast of element 7 (as specified by the "index to broadcast" field) of each of the 2 ("N2") groups of elements to corresponding destination vector register 234. "W" indicates that the elements of the source vector are 16-bit, or Word-sized elements. Accordingly, the source 231 is shown including two groups of elements, A and B, each of which contains 16 elements. "W512" indicates that the destination vector register has 512 bits (N=2×M=16×16 bits). In other embodiments, the width of the destination vector register may be specified as being one of 32 bits, 64 bits, 128 bits, 256 bits, and 1,024 bits. In other embodiments, the elements can have any of various different sizes, including any one of 2 bits, 4 bits, 8 bits, 16 bits, 32 bits, 64 bits, and 128 bits.

The format of Load Permute with Possible Broadcast (LPPB) instruction 230A is further illustrated and described at least with respect to FIGS. 4A-B, 5A-B, and 6A-D.

System 230 and execution circuit 233 are further illustrated and described at least with respect to FIGS. 1, 2A-2F, 2H-2K, 3, 8A,B, and 9A,B.

Figure 2H:
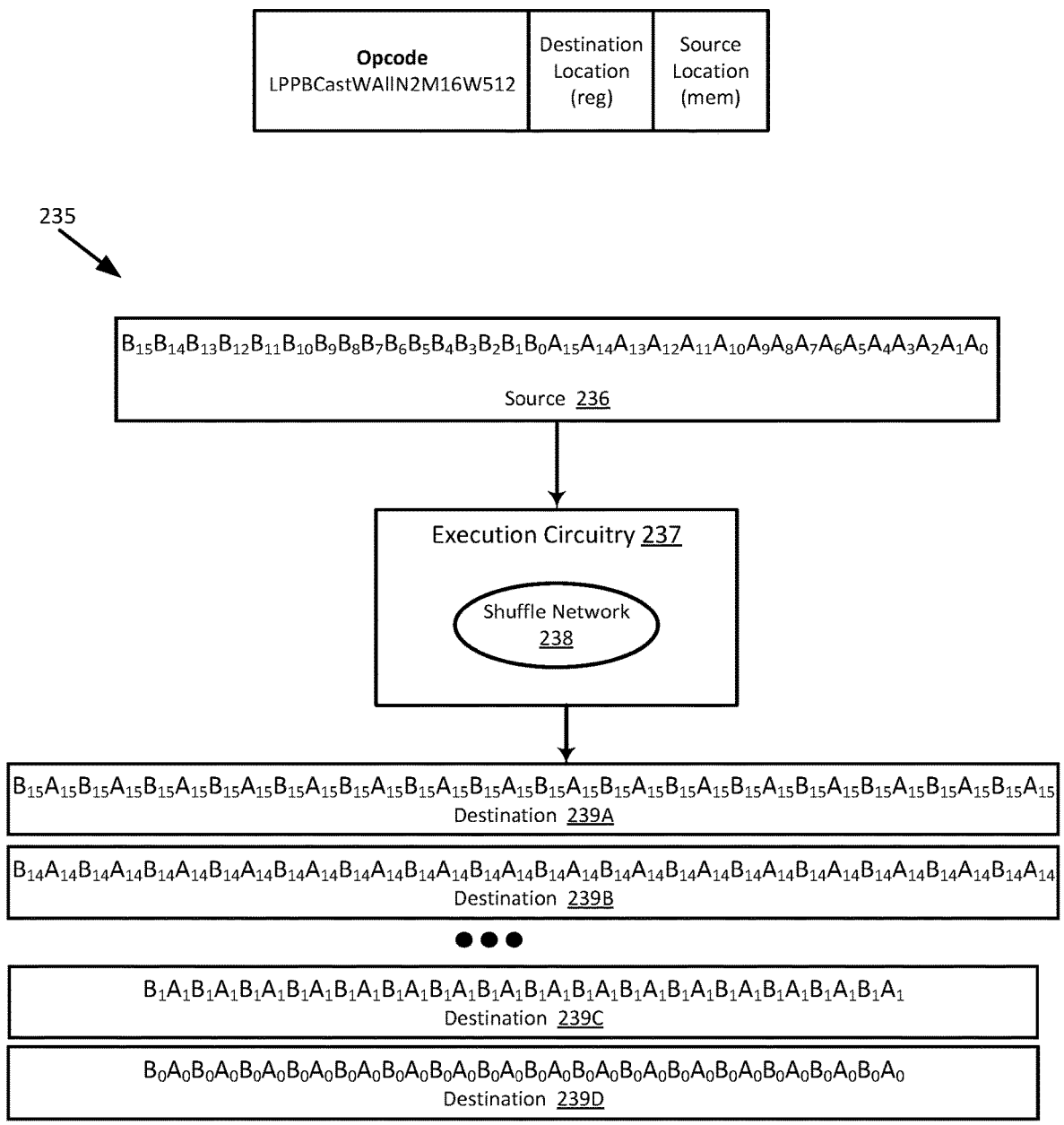
FIG. 2H is a block diagram illustrating execution of a Load Broadcast instruction, according to an embodiment.

FIG. 2H is a block diagram illustrating execution of a Load Broadcast instruction, according to an embodiment. As shown, Load Permute with Possible Broadcast (LPPB) Instruction 235A, which includes fields to specify an opcode (such as LPPBCastWAllN2M16W512), a destination vector register, and a memory location of a source vector comprising N groups of elements, N being a positive integer. The opcode is to indicate the processor is to fetch the source vector, generate write data comprising one or more N-tuples, each N-tuple comprising corresponding elements from each of the N groups of elements, and write the generated write data to the destination vector register, and is to be executed by system 235, which includes the source 236, the destination vector registers 239A-D, and execution circuitry 237, which includes shuffle network 238.

Here, the opcode mnemonic (LPPBCastWAllN2M16W512) includes suffixes to indicate the instruction behavior. "LPPBCastAll" indicates that the processor is to perform a permute as well as a broadcast ALL elements of each of the 2 ("N2") groups of elements to corresponding destination vector registers 239A-D. "W" indicates that the elements of the source vector are 16-bit, or Word-sized elements. Accordingly, the source 236 is shown including four groups of elements, A, B, C, and D, each of which contains 8 elements. "W512" indicates that the destination vector registers have 512 bits (N=4×M=8×16 bits). In other embodiments, the width of the destination vector register may be specified as being one of 32 bits, 64 bits, 128 bits, 256 bits, 512 bits, and 1,024 bits. In other embodiments, the elements can have any of various different sizes, including any one of 2 bits, 4 bits, 8 bits, 16 bits, 32 bits, 64 bits, and 128 bits.

The format of Load Permute with Possible Broadcast (LPPB) instruction 235A is further illustrated and described at least with respect to FIGS. 4A-B, 5A-B, and 6A-D.

System 235 and execution circuit 237 are further illustrated and described at least with respect to FIGS. 1, 2A-2G, 2I-2K, 3, 8A,B, and 9A,B.

Figure 2I:
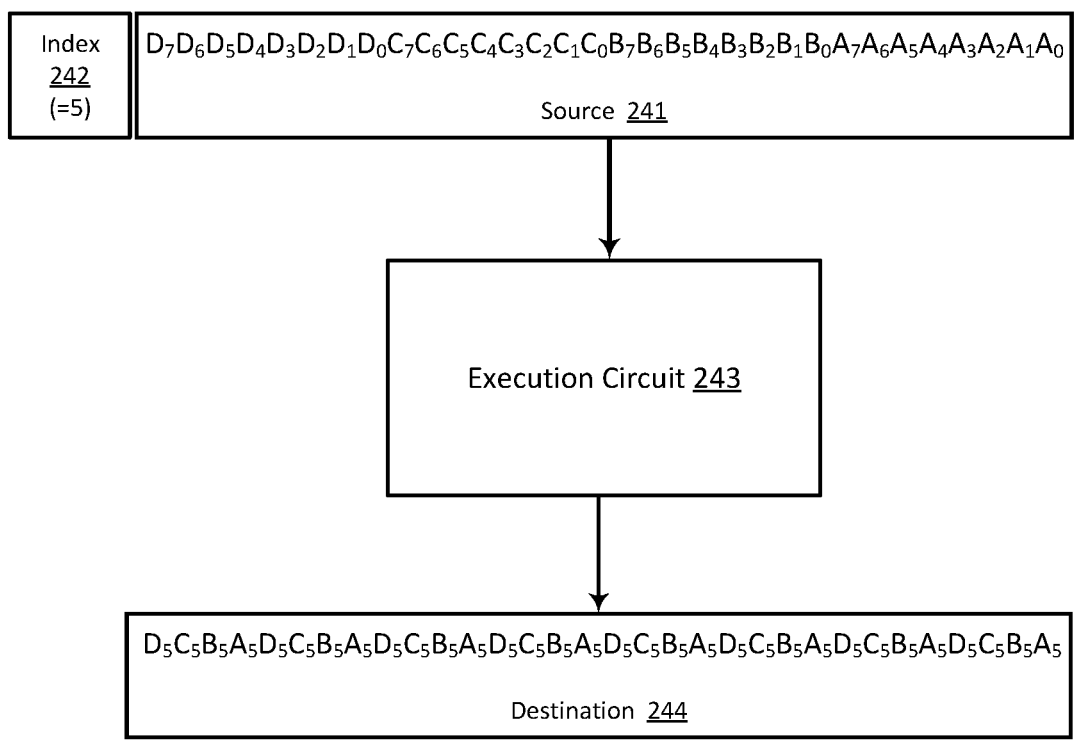
FIG. 2I is a block diagram illustrating execution of a Load Broadcast instruction, according to an embodiment.

FIG. 2I is a block diagram illustrating execution of a Load Broadcast instruction, according to an embodiment. As shown, Load Permute with Possible Broadcast (LPPB) Instruction 240A, which includes fields to specify an opcode (such as LPPBCastW5N4M8W512), a destination vector register, and a memory location of a source vector comprising N groups of elements, N being a positive integer. The opcode is to indicate the processor is to fetch the source vector, generate write data comprising one or more N-tuples, each N-tuple comprising corresponding elements from each of the N groups of elements, and write the generated write data to the destination vector register, and is to be executed by system 240, which includes the source 241, the specified index 242, which here is set to 5, the destination 244, and execution circuitry 243.

Here, the opcode mnemonic (LPPBCastW5N4M8W512) includes suffixes to indicate the instruction behavior. "LPPBCast" indicates that the processor is to perform a permute as well as a broadcast of element 5 (specified by "W5") of the source vector. "W" indicates that the elements of the source vector are 16-bit, or Word-sized elements. "N4" indicates that the source vector includes N=4 groups, with each group having M=8 elements. Accordingly, the source 241 is shown including four groups of elements, A, B, C, and D, each of which contains 8 elements. "W512" indicates that the destination vector register has 512 bits (N=4×M=8×16 bits). In other embodiments, the width of the destination vector register may be specified as being one of 32 bits, 64 bits, 128 bits, 246 bits, 512 bits, and 1,024 bits.

In other embodiments, the elements can have any of various different sizes, including one of 2 bits, 4 bits, 8 bits, 16 bits, 32 bits, 64 bits, and 128 bits.

The format of Load Permute with Possible Broadcast (LPPB) instruction 240A is further illustrated and described at least with respect to FIGS. 4A-B, 5A-B, and 6A-D.

System 240 and execution circuit 243 are further illustrated and described at least with respect to FIGS. 1, 2A-2H, 2J-2K, 3, 8A,B, and 9A,B.

Figure 2J:
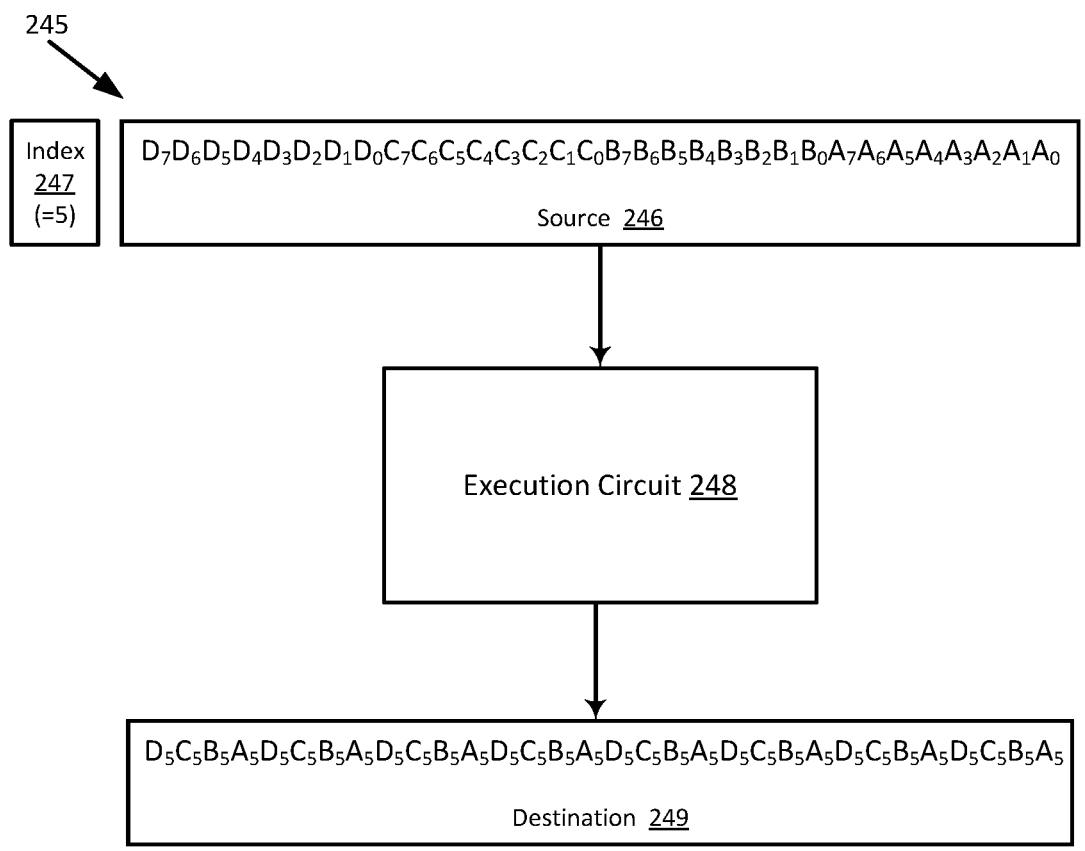
FIG. 2J is a block diagram illustrating execution of a Load Broadcast instruction, according to an embodiment.

FIG. 2J is a block diagram illustrating execution of a Load Broadcast instruction, according to an embodiment. As shown, Load Permute with Possible Broadcast (LPPB) Instruction 245A, which includes fields to specify an opcode (such as LPPBCastWN4M8W512), a destination vector register, and a memory location of a source vector comprising N groups of elements, N being a positive integer. The opcode to indicate the processor is to fetch the source vector, generate write data comprising one or more N-tuples, each N-tuple comprising corresponding elements from each of the N groups of elements, and write the generated write data to the destination vector register, and is to be executed by system 245, which includes the source 246, the destination 249, and execution circuitry 248, and the specified index to broadcast 247, which is 5.

Here, the opcode mnemonic (LPPBCastWN4M8W512) includes suffixes to indicate the instruction behavior. "LPPBCast" indicates that the processor is to perform a permute as well as a broadcast element 5 (index to broadcast) out of the 8 ("M8") elements of each of the 4 ("N4") groups of elements. "W" indicates that the elements of the source vector are 16-bit, or Word-sized elements. Accordingly, the source 246 is shown including four groups of elements, A, B, C, and D, each of which contains 8 elements. "W512" indicates that the destination vector register has 512 bits (N=4×M=8×16 bits). In other embodiments, the width of the destination vector register may be specified as being one of 32 bits, 64 bits, 128 bits, 256 bits, 512 bits, and 1,024 bits. In other embodiments, the elements can have any of various different sizes, including any one of 2 bits, 4 bits, 8 bits, 16 bits, 32 bits, 64 bits, and 128 bits.

The format of Load Permute with Possible Broadcast (LPPB) instruction 245A is further illustrated and described at least with respect to FIGS. 4A-B, 5A-B, and 6A-D.

System 245 and execution circuit 247 are further illustrated and described at least with respect to FIGS. 1, 2A-2I, 2K, 3, 8A,B, and 9A,B.

Figure 2K:
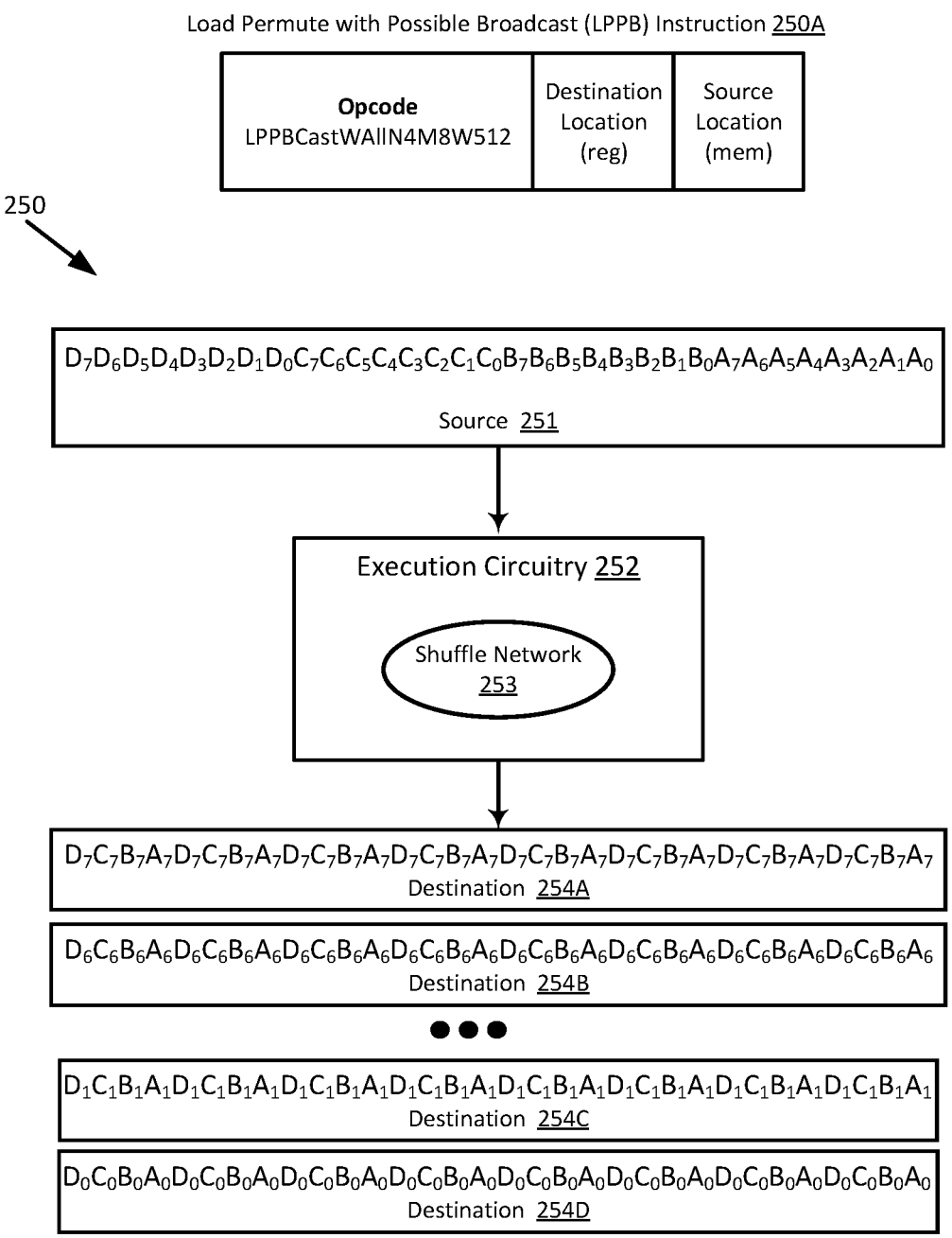
FIG. 2K is a block diagram illustrating execution of a Load Broadcast instruction, according to an embodiment.

FIG. 2K is a block diagram illustrating execution of a Load Broadcast instruction, according to an embodiment. As shown, Load Permute with Possible Broadcast (LPPB) Instruction 250A, which includes fields to specify an opcode (such as LPPBCastWAllN4M8W512), a destination vector register, and a memory location of a source vector comprising N groups of elements, N being a positive integer. The opcode is to indicate the processor is to fetch the source vector, generate write data comprising one or more N-tuples, each N-tuple comprising corresponding elements from each of the N groups of elements, and write the generated write data to the destination vector register, and is to be executed by system 250, which includes the source 251, the destinations 254A-D, and execution circuitry 252, which includes shuffle network 253.

Here, the opcode mnemonic (LPPBCastWAllN4M8W512) includes suffixes to indicate the instruction behavior. "LPPBCastAll" indicates that the processor is to perform a permute as well as a broadcast ALL elements of the source vector. "W" indicates that the elements of the source vector are 16-bit, or Word-sized elements. "N4" indicates that the source vector includes N=4 groups, with each group having "M8" elements. Accordingly, the source 251 is shown including four groups of elements, A, B, C, and D, each of which contains 8 elements. "W512" indicates that the destination vector register has 512 bits (N=4×M=8×16 bits). In other embodiments, the width of the destination vector register may be specified as being one of 32 bits, 64 bits, 128 bits, 256 bits, 512 bits, and 1,024 bits. In other embodiments, the elements can have any of various different sizes, including one of 2 bits, 4 bits, 8 bits, 16 bits, 32 bits, 64 bits, and 128 bits.

The format of Load Permute with Possible Broadcast (LPPB) instruction 250A is further illustrated and described at least with respect to FIGS. 4A-B, 5A-B, and 6A-D.

System 250 and execution circuit 252 are further illustrated and described at least with respect to FIGS. 1, 2A-2J, 3, 8A,B, and 9A,B.

Figure 3:
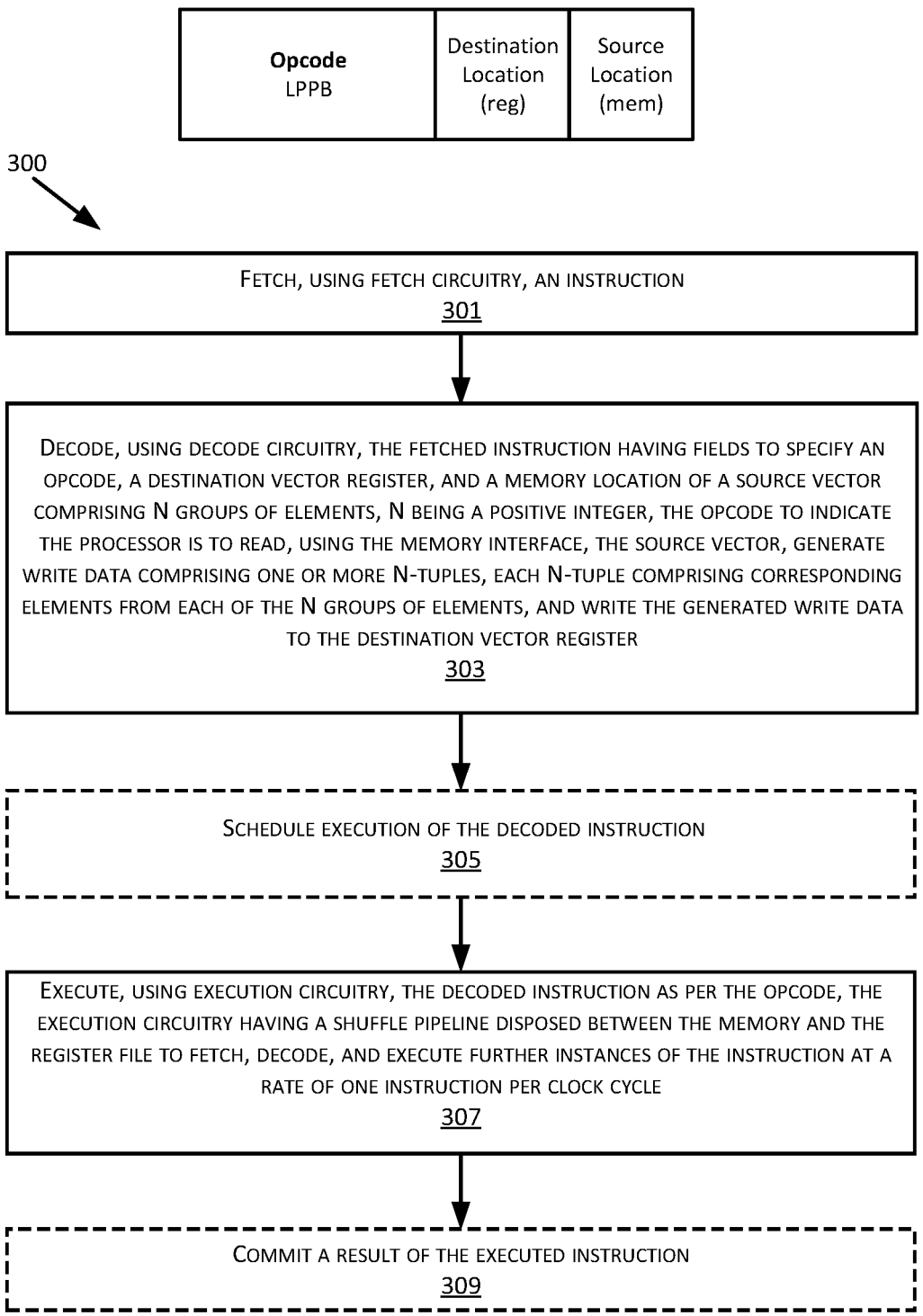
FIG. 3 is a process flow diagram illustrating a processor responding to a Load Permute with Possible Broadcast (LPPB) instruction, according to an embodiment.

FIG. 3 is a process flow diagram illustrating a processor responding to a Load Permute with Possible Broadcast (LPPB) instruction, according to an embodiment. As shown, process flow 300 is to be executed by a processor in response to a Load Permute with Possible Broadcast (LPPB) instruction 310, which includes fields to specify an opcode (such as LPPB), a destination vector register, and a source vector location.

At operation 301, the processor is to fetch, using fetch circuitry, an instruction. At operation 303, the processor is to decode, using decode circuitry, the fetched instruction having fields to specify an opcode, a destination vector register, and a memory location of a source vector comprising N groups of elements, N being a positive integer, the opcode to indicate the processor is to read, using the memory interface, the source vector; generate write data comprising one or more N-tuples, each N-tuple comprising corresponding elements from each of the N groups of elements; and write the generated write data to the destination vector register. In some embodiments, at operation 305, the processor is to schedule execution of the decoded instruction. At operation 307, the processor is to execute, using execution circuitry, the decoded instruction as per the opcode, the execution circuitry having a shuffle pipeline disposed between the memory and the register file to fetch, decode, and execute further instances of the instruction at a rate of one instruction per clock cycle. An example of such a shuffle pipeline is illustrated and described with respect to FIG. 2A. In some embodiments, at operation 309, the processor is to commit a result of the executed instruction. Operations 305 and 309 are optional, as indicated by their dashed borders, insofar as they may each occur at a different time, or not at all.

Figure 4A:
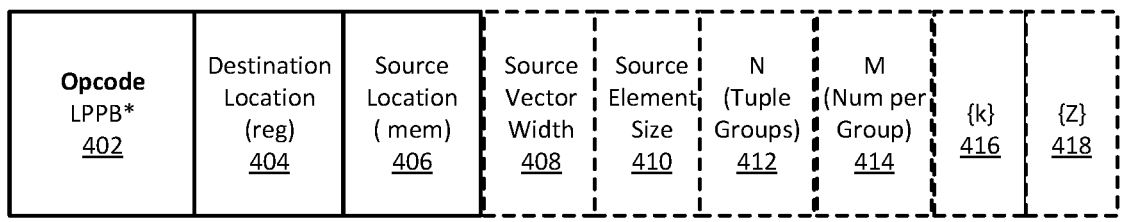
FIG. 4A is a block diagram illustrating a format of a Load Permute with Possible Broadcast (LPPB) instruction, according to an embodiment.

FIG. 4A is a block diagram illustrating a format of a Load Permute with Possible Broadcast (LPPB) instruction, according to an embodiment. As shown, LPPB instruction 400 includes fields to specify an opcode (LPPB*) 402 and locations of source 406 and destination 404 vectors. In the context of the instruction, the source vector is to include N groups of elements, N being a positive integer, and opcode 402 is to indicate the processor is to fetch the source vector from source location 406 (a memory location); generate write data comprising one or more N-tuples, each N-tuple comprising corresponding elements from each of the N groups of elements; and write the generated write data to the destination vector location 404 (a vector register in the register file). LPPB instruction 400 calls for processor behavior similar to that shown in FIGS. 2B-2D.

LPPB instruction 400 includes several behavior modifiers that are optional, as indicated by their dashed borders. These include source vector width 408 (i.e., one of 32 bits, 64 bits, 128 bits, 256 bits, 512 bits, 1,024 bits, and the like), source element size 410 (i.e. 2 bits, 4 bits, 8 bits, 16 bits, 32 bits, 64 bits, 128 bits, and the like), a number of tuple groups, N 412 (e.g., 1, 2, 4, 8, or more); and a number of elements per tuple group, M 414.

LPPB instruction 400 may further include fields to specify a multibit mask, {k} 416, with each bit to control whether to allow modification of a corresponding destination vector element, or if that corresponding element is to be masked. The instruction may also optionally specify a {z} 418 parameter to control whether masked destination vector elements are to be zeroed or merged.

The mnemonic of opcode 402 is shown as including an asterisk (*), which is to indicate that the opcode can include as prefixes or suffixes various optional modifiers that could otherwise be specified as one or more of instruction fields 408, 410, 412, 414, 416, and 418.

It should be noted that any one or more of the optional instruction fields 408, 410, 412, 414, 416, and 418 may take on a default value if not specified or may be programmed by software in advance of issuing the instruction, for example by programming an architectural model specific register (MSR).

A format of the LPPB instruction 400 is further illustrated and described with respect to FIGS. 4B, 5A-B, and 6A-D.

Figure 4B:
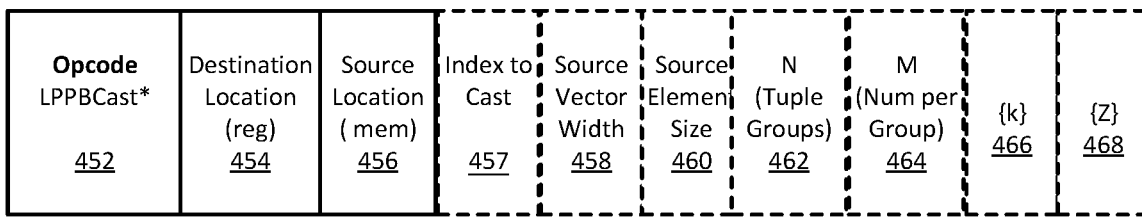
FIG. 4B is a block diagram illustrating a format of a Load Permute and Broadcast instruction, according to an embodiment.

FIG. 4B is a block diagram illustrating a format of a Load Permute with Possible Broadcast instruction, according to an embodiment. One difference between FIGS. 4A and 4B is that the latter instruction, similar to the execution flows illustrated and described with respect to FIGS. 2E-2K, calls for broadcasting to the destination vector. As shown, LPPB instruction 450 includes fields to specify an opcode 452 (represented, for example, by a mnemonic, LPPBCast*) and locations of source 456 and destination 454 vectors. In the context of the instruction, the source vector is to include N groups of elements, N being a positive integer, and opcode 452 is to indicate the processor is to fetch the source vector from source location 456 (such as a memory location); generate write data comprising one or more N-tuples, each N-tuple comprising corresponding elements from each of the N groups of elements; and write the generated write data to the destination vector location 454 (such as a vector register in a register file).

LPPB instruction 450 includes several behavior modifiers that are optional, as indicated by their dashed borders. These include index to cast 457 (i.e., the group index to broadcast to the destination, as shown, for example, in FIGS. 2E, 2F, and 2G), source vector width 458 (i.e., one of 32 bits, 64 bits, 128 bits, 256 bits, 512 bits, or more), source element size 460 (i.e., 2 bits, 4 bits, 8 bits, 16 bits, 32 bits, 64 bits, 128 bits, and the like), a number of tuple groups, N 462 (e.g., 1, 2, 4, 8, or more); and a number of elements per tuple group, M 464.

LPPB instruction 450 may further include fields to specify a multibit mask, {k} 466, with each bit to control whether to allow modification of a corresponding destination vector element, or if that corresponding element is to be masked. The instruction may also optionally specify a {z} 468 parameter to control whether masked destination vector elements are to be zeroed or merged.

Opcode 452 is shown as including an asterisk (*), which is to indicate that the opcode can include as prefixes or suffixes various optional modifiers that could otherwise be specified as one or more of instruction fields 457, 458, 460, 462, 464, 466, and 468.

It should be noted that any one or more of the optional instruction fields 457, 458, 460, 462, 464, 466, and 468 may take on a default value if not specified or may be programmed by software in advance of issuing the instruction, for example by programming an architectural model specific register (MSR).

A format of the LPPB instruction 400 is further illustrated and described with respect to FIGS. 4B, 5A-B, and 6A-D.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 5A:
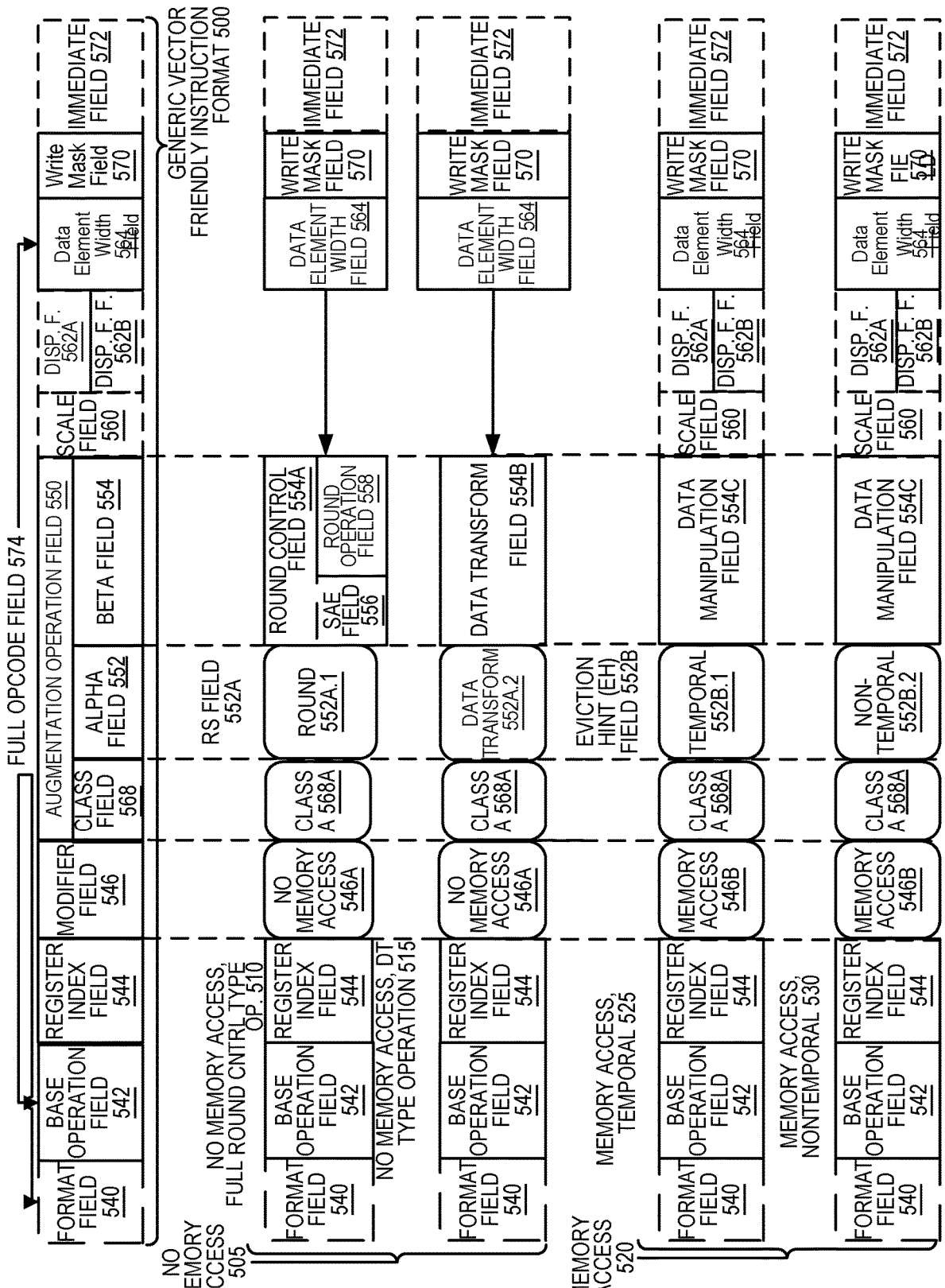
FIGS. 5A-5B are block diagrams illustrating a generic vector friendly instruction format and instruction templates thereof according to some embodiments of the invention.
Figure 5B:
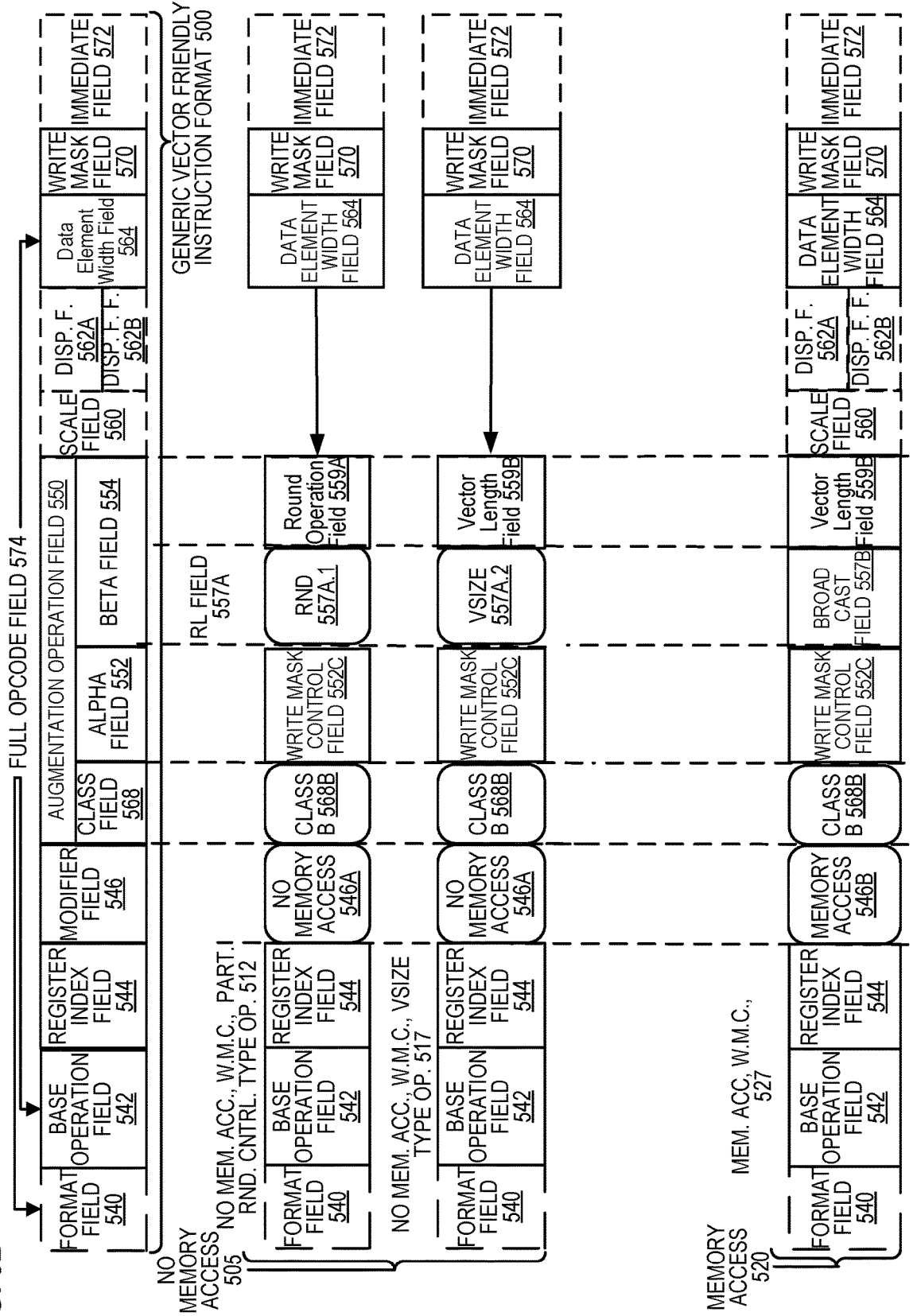

FIGS. 5A-5B are block diagrams illustrating a generic vector friendly instruction format and instruction templates thereof according to some embodiments of the invention. FIG. 5A is a block diagram illustrating a generic vector friendly instruction format and class A instruction templates thereof according to some embodiments of the invention; while FIG. 5B is a block diagram illustrating the generic vector friendly instruction format and class B instruction templates thereof according to some embodiments of the invention. Specifically, a generic vector friendly instruction format 500 for which are defined class A and class B instruction templates, both of which include no memory access 505 instruction templates and memory access 520 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 5A include: 1) within the no memory access 505 instruction templates there is shown a no memory access, full round control type operation 510 instruction template and a no memory access, data transform type operation 515 instruction template; and 2) within the memory access 520 instruction templates there is shown a memory access, temporal 525 instruction template and a memory access, non-temporal 530 instruction template. The class B instruction templates in FIG. 5B include: 1) within the no memory access 505 instruction templates there is shown a no memory access, write mask control, partial round control type operation 512 instruction template and a no memory access, write mask control, vsize type operation 517 instruction template; and 2) within the memory access 520 instruction templates there is shown a memory access, write mask control 527 instruction template.

The generic vector friendly instruction format 500 includes the following fields listed below in the order illustrated in FIGS. 5A-5B.

Format field 540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 542—its content distinguishes different base operations.

Register index field 544—its content, directly or through address generation, specifies the locations of the source and destination operands, be they in registers or in memory. These include a sufficient number of bits to select N registers from a P×Q (e.g. 32×512, 16×128, 32×1,024, 64×1,024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 546—its content distinguishes occurrences of instructions in the generic vector instruction format that specify memory access from those that do not; that is, between no memory access 505 instruction templates and memory access 520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 550—its content distinguishes which one of a variety of different operations to be performed in addition to the base operation. This field is context specific. In some embodiments, this field is divided into a class field 568, an alpha field 552, and a beta field 554. The augmentation operation field 550 allows common groups of operations to be performed in a single instruction rather than 2, 3, or 4 instructions.

Scale field 560—its content allows for the scaling of the index field's content for memory address generation (e.g., for address generation that uses $2^{scale}*\text{index}+\text{base}$).

Displacement Field 562A—its content is used as part of memory address generation (e.g., for address generation that uses $2^{scale}*\text{index}+\text{base}+\text{displacement}$).

Displacement Factor Field 562B (note that the juxtaposition of displacement field 562A directly over displacement factor field 562B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 574 (described later herein) and the data manipulation field 554C. The displacement field 562A and the displacement factor field 562B are optional in the sense that they are not used for the no memory access 505 instruction templates and/or different embodiments may implement only one or none of the two.

Data element width field 564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 570 allows for partial vector operations, including loads, stores, arithmetic, logical, etc. While embodiments of the invention are described in which the write mask field's 570 content selects one of a number of write mask registers that contains the write mask to be used (and thus the write mask field's 570 content indirectly identifies that masking to be performed), alternative embodiments instead or additional allow the mask write field's 570 content to directly specify the masking to be performed.

Immediate field 572—its content allows for the specification of an immediate. This field is optional in the sense that is it not present in an implementation of the generic vector friendly format that does not support immediate and it is not present in instructions that do not use an immediate.

Class field 568—its content distinguishes between different classes of instructions. With reference to FIGS. 5A-B, the contents of this field select between class A and class B instructions. In FIGS. 5A-B, rounded corner squares are used to indicate a specific value is present in a field (e.g., class A 568A and class B 568B for the class field 568 respectively in FIGS. 5A-B).

Instruction Templates of Class A

In the case of the non-memory access 505 instruction templates of class A, the alpha field 552 is interpreted as an RS field 552A, whose content distinguishes which one of the different augmentation operation types are to be performed (e.g., round 552A.1 and data transform 552A.2 are respectively specified for the no memory access, round type operation 510 and the no memory access, data transform type operation 515 instruction templates), while the beta field 554 distinguishes which of the operations of the specified type is to be performed. In the no memory access 505 instruction templates, the scale field 560, the displacement field 562A, and the displacement scale filed 562B are not present.

No-Memory Access Instruction Templates—Full Round Control Type Operation

In the no memory access full round control type operation 510 instruction template, the beta field 554 is interpreted as a round control field 554A, whose content(s) provide static rounding. While in the described embodiments of the invention the round control field 554A includes a suppress all floating-point exceptions (SAE) field 556 and a round operation control field 558, alternative embodiments may support may encode both these concepts into the same field or only have one or the other of these concepts/fields (e.g., may have only the round operation control field 558).

SAE field 556—its content distinguishes whether or not to disable the exception event reporting; when the SAE field's 556 content indicates suppression is enabled, a given instruction does not report any kind of floating-point exception flag and does not raise any floating-point exception handler.

Round operation control field 558—its content distinguishes which one of a group of rounding operations to perform (e.g., Round-up, Round-down, Round-towards-zero and Round-to-nearest). Thus, the round operation control field 558 allows for the changing of the rounding mode on a per instruction basis. In some embodiments where a processor includes a control register for specifying rounding modes, the round operation control field's 550 content overrides that register value.

No Memory Access Instruction Templates—Data Transform Type Operation

In the no memory access data transform type operation 515 instruction template, the beta field 554 is interpreted as a data transform field 554B, whose content distinguishes which one of a number of data transforms is to be performed (e.g., no data transform, swizzle, broadcast).

In the case of a memory access 520 instruction template of class A, the alpha field 552 is interpreted as an eviction hint field 552B, whose content distinguishes which one of the eviction hints is to be used (in FIG. 5A, temporal 552B.1 and non-temporal 552B.2 are respectively specified for the memory access, temporal 525 instruction template and the memory access, non-temporal 530 instruction template), while the beta field 554 is interpreted as a data manipulation field 554C, whose content distinguishes which one of a number of data manipulation operations (also known as primitives) is to be performed (e.g., no manipulation; broadcast; up conversion of a source; and down conversion of a destination). The memory access 520 instruction templates include the scale field 560, and optionally the displacement field 562A or the displacement scale field 562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 552 is interpreted as a write mask control (Z) field 552C, whose content distinguishes whether the write masking controlled by the write mask field 570 should be a merging or a zeroing.

In the case of the non-memory access 505 instruction templates of class B, part of the beta field 554 is interpreted as an RL field 557A, whose content distinguishes which one of the different augmentation operation types are to be performed (e.g., round 557A.1 and vector length (VSIZE) 557A.2 are respectively specified for the no memory access, write mask control, partial round control type operation 512 instruction template and the no memory access, write mask control, VSIZE type operation 517 instruction template), while the rest of the beta field 554 distinguishes which of the operations of the specified type is to be performed. In the no memory access 505 instruction templates, the scale field 560, the displacement field 562A, and the displacement scale filed 562B are not present.

In the no memory access, write mask control, partial round control type operation 510 instruction template, the rest of the beta field 554 is interpreted as a round operation field 559A and exception event reporting is disabled (a given instruction does not report any kind of floating-point exception flag and does not raise any floating-point exception handler).

Round operation control field 559A—just as round operation control field 558, its content distinguishes which one of a group of rounding operations to perform (e.g., Round-up, Round-down, Round-towards-zero and Round-to-nearest). Thus, the round operation control field 559A allows for the changing of the rounding mode on a per instruction basis. In some embodiments where a processor includes a control register for specifying rounding modes, the round operation control field's 550 content overrides that register value.

In the no memory access, write mask control, VSIZE type operation 517 instruction template, the rest of the beta field 554 is interpreted as a vector length field 559B, whose content distinguishes which one of a number of data vector lengths is to be performed on (e.g., 128, 256, or 512 byte).

In the case of a memory access 520 instruction template of class B, part of the beta field 554 is interpreted as a broadcast field 557B, whose content distinguishes whether or not the broadcast type data manipulation operation is to be performed, while the rest of the beta field 554 is interpreted the vector length field 559B. The memory access 520 instruction templates include the scale field 560, and optionally the displacement field 562A or the displacement scale field 562B.

With regard to the generic vector friendly instruction format 500, a full opcode field 574 is shown including the format field 540, the base operation field 542, and the data element width field 564. While one embodiment is shown where the full opcode field 574 includes all of these fields, the full opcode field 574 includes less than all of these fields in embodiments that do not support all of them. The full opcode field 574 provides the operation code (opcode).

The augmentation operation field 550, the data element width field 564, and the write mask field 570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

Figure 6A:
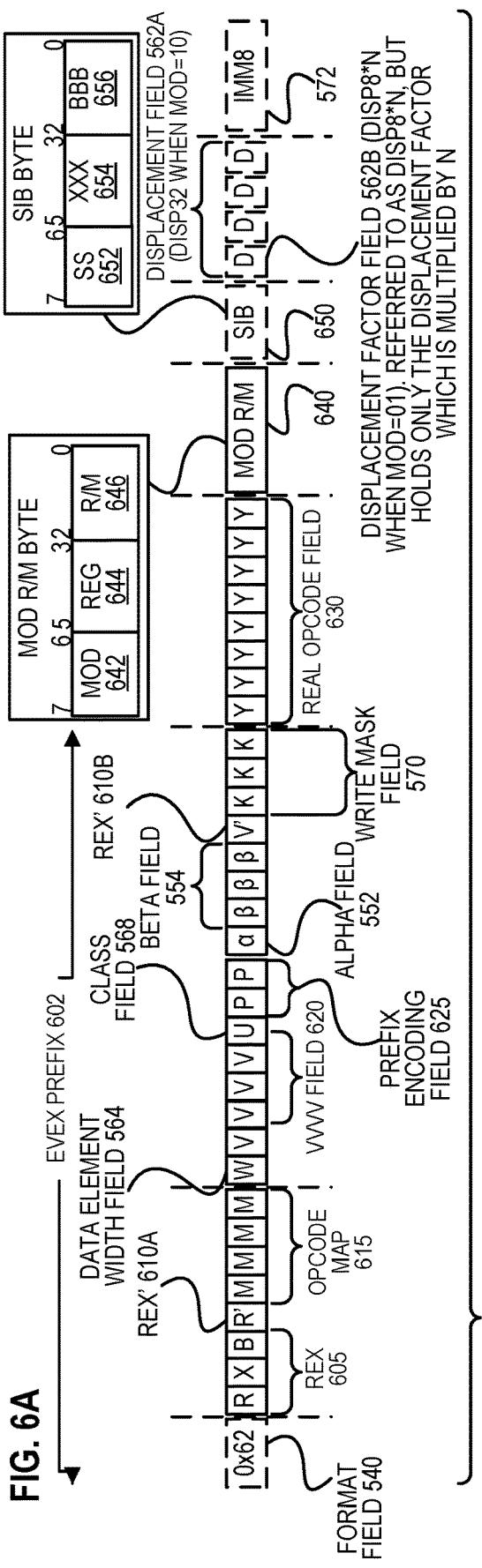
FIG. 6A is a block diagram illustrating an exemplary specific vector friendly instruction format according to some embodiments of the invention.

FIG. 6A is a block diagram illustrating an exemplary specific vector friendly instruction format according to some embodiments of the invention. FIG. 6A shows a specific vector friendly instruction format 600 that is specific in the sense that it specifies the location, size, interpretation, and order of the fields, as well as values for some of those fields. The specific vector friendly instruction format 600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 5 into which the fields from FIG. 6A map are illustrated.

It should be understood that, although embodiments of the invention are described with reference to the specific vector friendly instruction format 600 in the context of the generic vector friendly instruction format 500 for illustrative purposes, the invention is not limited to the specific vector friendly instruction format 600 except where claimed. For example, the generic vector friendly instruction format 500 contemplates a variety of possible sizes for the various fields, while the specific vector friendly instruction format 600 is shown as having fields of specific sizes. By way of specific example, while the data element width field 564 is illustrated as a one bit field in the specific vector friendly instruction format 600, the invention is not so limited (that is, the generic vector friendly instruction format 500 contemplates other sizes of the data element width field 564).

The generic vector friendly instruction format 500 includes the following fields listed below in the order illustrated in FIG. 6A.

EVEX Prefix (Bytes 0-3) 602—is encoded in a four-byte form.

Format Field 540 (EVEX Byte 0, bits [7:0])—the first byte (EVEX Byte 0) is the format field 540 and it contains 0x62 (the unique value used for distinguishing the vector friendly instruction format in some embodiments).

The second-fourth bytes (EVEX Bytes 1-3) include a number of bit fields providing specific capability.

REX field 605 (EVEX Byte 1, bits [7-5])—consists of an EVEX.R bit field (EVEX Byte 1, bit [7]-R), EVEX.X bit field (EVEX byte 1, bit [6]-X), and 557BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 610A—this is the first part of the REX' field 610 and is the EVEX.R' bit field (EVEX Byte 1, bit [4]-R') that is used to encode either the upper 16 or lower 16 of the extended 32 register set. In some embodiments, this bit, along with others as indicated below, is stored in bit inverted format to distinguish (in the well-known x86 32-bit mode)

from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 615 (EVEX byte 1, bits [3:0]—mmmm)—its content encodes an implied leading opcode byte (0F, 0F 38, or 0F 3).

Data element width field 564 (EVEX byte 2, bit [7]-W)—is represented by the notation EVEX.W. EVEX.W is used to define the granularity (size) of the datatype (either 32-bit data elements or 64-bit data elements).

EVEX.vvvv 620 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 620 encodes the 4 low-order bits of the first source register specifier stored in inverted (1s complement) form. Depending on the instruction, an extra different EVEX bit field is used to extend the specifier size to 32 registers.

EVEX.U 568 Class field (EVEX byte 2, bit [2]-U)—If EVEX.U=0, it indicates class A or EVEX.U0; if EVEX.U=1, it indicates class B or EVEX.U1.

Prefix encoding field 625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 552 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 554 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 610B—this is the remainder of the REX' field 610 and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 570 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 630 (Byte 4) is also known as the opcode byte. Part of the opcode is specified in this field.

MOD R/M Field 640 (Byte 5) includes MOD field 642, Reg field 644, and R/M field 646. As previously described, the MOD field's 642 content distinguishes between memory access and non-memory access operations. The role of Reg field 644 can be summarized to two situations: encoding either the destination register operand or a source register operand or be treated as an opcode extension and not used to encode any instruction operand. The role of R/M field 646 may include the following: encoding the instruction operand that references a memory address or encoding either the destination register operand or a source register operand.

Scale, Index, Base (SIB) Byte (Byte 6)—As previously described, the scale field's 550 content is used for memory address generation. SIB.xxx 654 and SIB.bbb 656—the contents of these fields have been previously referred to with regard to the register indexes Xxxx and Bbbb.

Displacement field 562A (Bytes 7-10)—when MOD field 642 contains 10, bytes 7-10 are the displacement field 562A, and it works the same as the legacy 32-bit displacement (disp32) and works at byte granularity.

Displacement factor field 562B (Byte 7)—when MOD field 642 contains 01, byte 7 is the displacement factor field 562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 562B is a reinterpretation of disp8; when using displacement factor field 562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 562B substitutes the legacy x86 instruction set 8-bit displacement. Thus, the displacement factor field 562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 572 operates as previously described.

Full Opcode Field

Figure 6B:
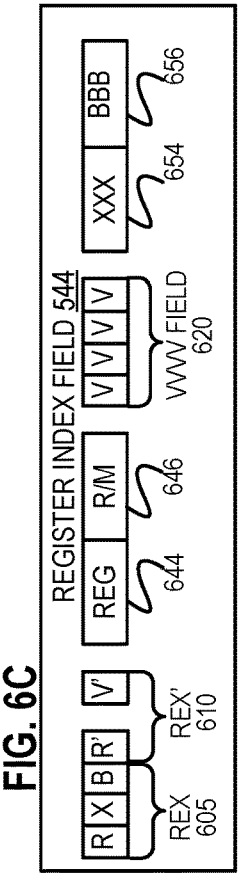
FIG. 6B is a block diagram illustrating the fields of the specific vector friendly instruction format that make up the full opcode field according to one embodiment.

FIG. 6B is a block diagram illustrating the fields of the specific vector friendly instruction format 600 that make up the full opcode field 574 according to some embodiments.

Specifically, the full opcode field 574 includes the format field 540, the base operation field 542, and the data element width (W) field 564. The base operation field 542 includes the prefix encoding field 625, the opcode map field 615, and the real opcode field 630.

Register Index Field

Figure 6C:
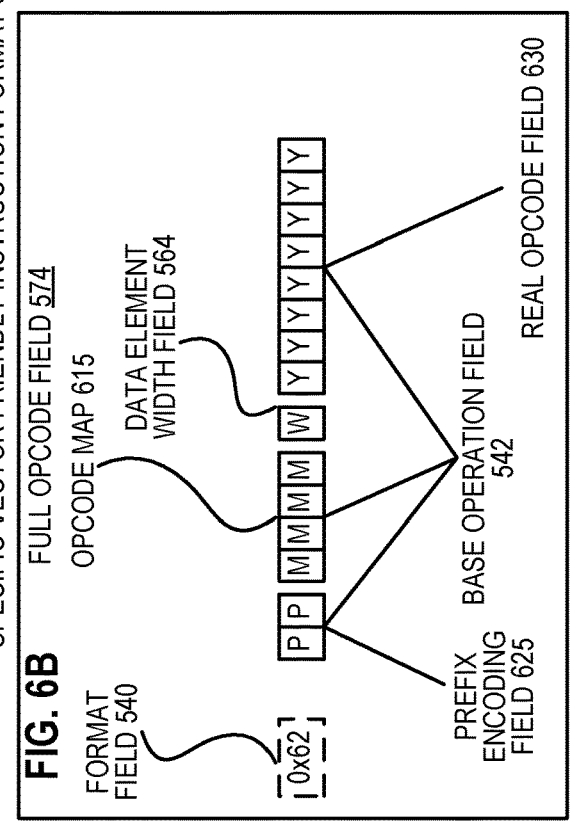
FIG. 6C is a block diagram illustrating the fields of the specific vector friendly instruction format that make up the register index field according to one embodiment.

FIG. 6C is a block diagram illustrating the fields of the specific vector friendly instruction format 600 that make up the register index field 544 according to some embodiments. Specifically, the register index field 544 includes the REX field 605, the REX' field 610, the MODR/M.reg field 644, the MODR/M.r/m field 646, the VVVV field 620, xxx field 654, and the bbb field 656.

Augmentation Operation Field

Figure 6D:
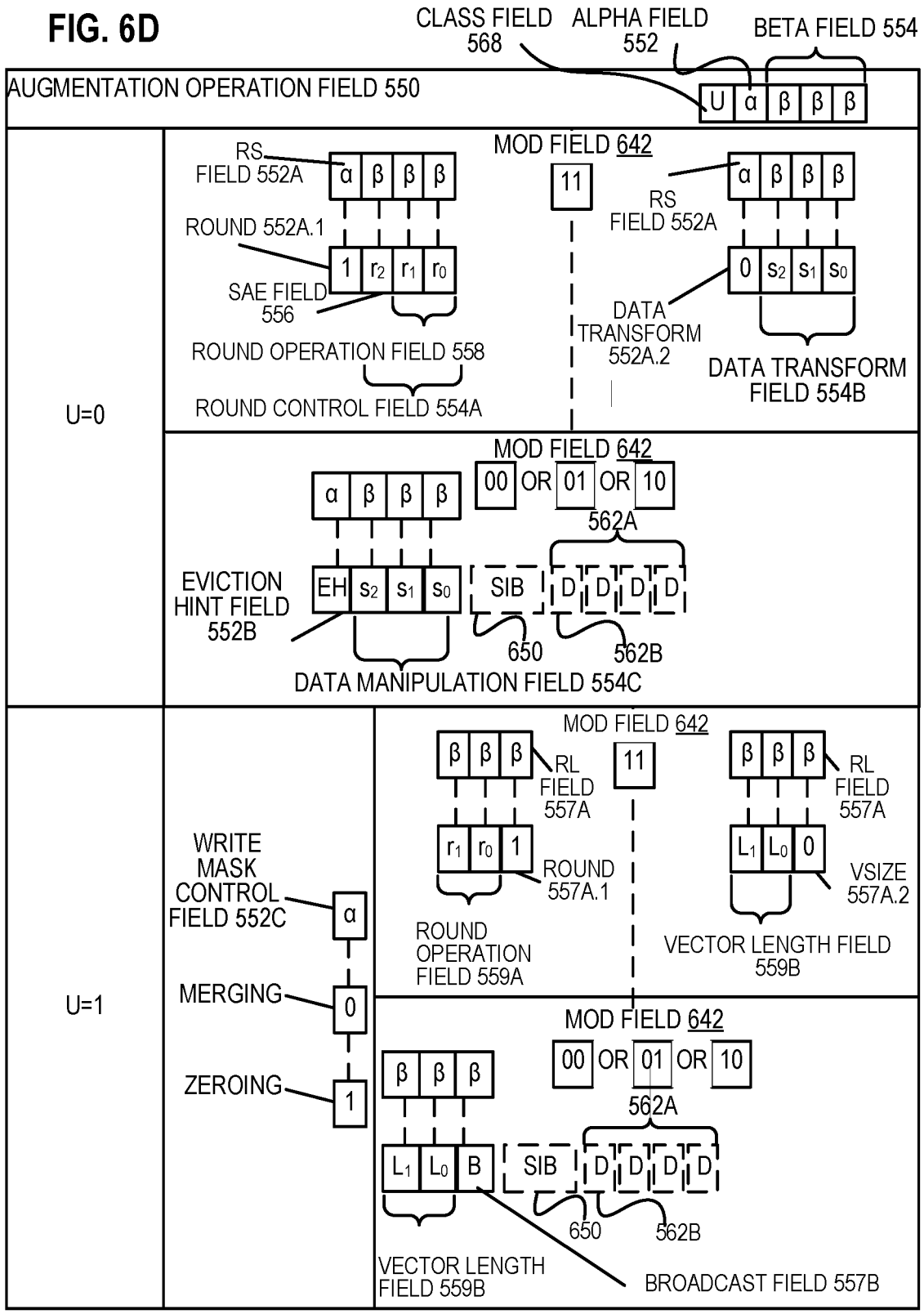
FIG. 6D is a block diagram illustrating the fields of the specific vector friendly instruction format that make up the augmentation operation field according to one embodiment.

FIG. 6D is a block diagram illustrating the fields of the specific vector friendly instruction format 600 that make up the augmentation operation field 550 according to some embodiments. When the class (U) field 568 contains 0, it signifies EVEX.U0 (class A 568A); when it contains 1, it signifies EVEX.U1 (class B 568B). When U=0 and the MOD field 642 contains 11 (signifying a no memory access operation), the alpha field 552 (EVEX byte 3, bit [7]-EH) is interpreted as the rs field 552A. When the rs field 552A contains a 1 (round 552A.1), the beta field 554 (EVEX byte 3, bits [6:4]-SSS) is interpreted as the round control field 554A. The round control field 554A includes a one bit SAE field 556 and a two bit round operation field 558. When the rs field 552A contains a 0 (data transform 552A.2), the beta field 554 (EVEX byte 3, bits [6:4]-SSS) is interpreted as a three bit data transform field 554B. When U=0 and the MOD field 642 contains 00, 01, or 10 (signifying a memory access operation), the alpha field 552 (EVEX byte 3, bit [7]-EH) is interpreted as the eviction hint (EH) field 552B and the beta field 554 (EVEX byte 3, bits [6:4]-SSS) is interpreted as a three bit data manipulation field 554C.

When U=1, the alpha field 552 (EVEX byte 3, bit [7]-EH) is interpreted as the write mask control (Z) field 552C. When U=1 and the MOD field 642 contains 11 (signifying a no memory access operation), part of the beta field 554 (EVEX byte 3, bit [4]-$S_0$) is interpreted as the RL field 557A; when it contains a 1 (round 557A.1) the rest of the beta field 554 (EVEX byte 3, bit [6-5]-$S_{2-1}$) is interpreted as the round operation field 559A, while when the RL field 557A contains a 0 (VSIZE 557.A2) the rest of the beta field 554 (EVEX byte 3, bit [6-5]-$S_{2-1}$) is interpreted as the vector length field 559B (EVEX byte 3, bit [6-5]-$L_{1-0}$). When U=1 and the MOD field 642 contains 00, 01, or 10 (signifying a memory access operation), the beta field 554 (EVEX byte 3, bits [6:4]-SSS) is interpreted as the vector length field 559B (EVEX byte 3, bit [6-5]-$L_{1-0}$) and the broadcast field 557B (EVEX byte 3, bit [4]-B).

Exemplary Register Architecture

FIG. 7 is a block diagram of a register architecture 700 according to some embodiments. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 600 operates on these overlaid register file as illustrated in the below tables.

| Adjustable Vector Length | Class | Operations | Registers |
| --- | --- | --- | --- |
| Instruction Templates that do not include the vector length field 559B | A (FIG. 5A; U = 0) | 510, 515, 525, 530 | zmm registers (the vector length is 64 byte) |
| | B (FIG. 5B; U = 1) | 512 | zmm registers (the vector length is 64 byte) |
| Instruction templates that do include the vector length field 559B | B (FIG. 5B; U = 1) | 517, 527 | zmm, ymm, or xmm registers (the vector length is 64 byte, 32 byte, or 16 byte) depending on the vector length field 559B |

In other words, the vector length field 559B selects between a maximum length and one or more other shorter lengths, where each such shorter length is half the length of the preceding length; and instructions templates without the vector length field 559B operate on the maximum vector length. Further, in one embodiment, the class B instruction templates of the specific vector friendly instruction format 600 operate on packed or scalar single/double-precision floating-point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 715—in the embodiment illustrated, there are 8 write mask registers (k0 through k7), each 64 bits in size. In an alternate embodiment, the write mask registers 715 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 745, on which is aliased the MMX packed integer flat register file 750—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 8A is a block diagram illustrating both an exemplary in-order pipeline and an exemplary register renaming, out-of-order issue/execution pipeline according to some embodiments of the invention. FIG. 8B is a block diagram illustrating both an exemplary embodiment of an in-order architecture core and an exemplary register renaming, out-of-order issue/execution architecture core to be included in a processor according to some embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length-decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
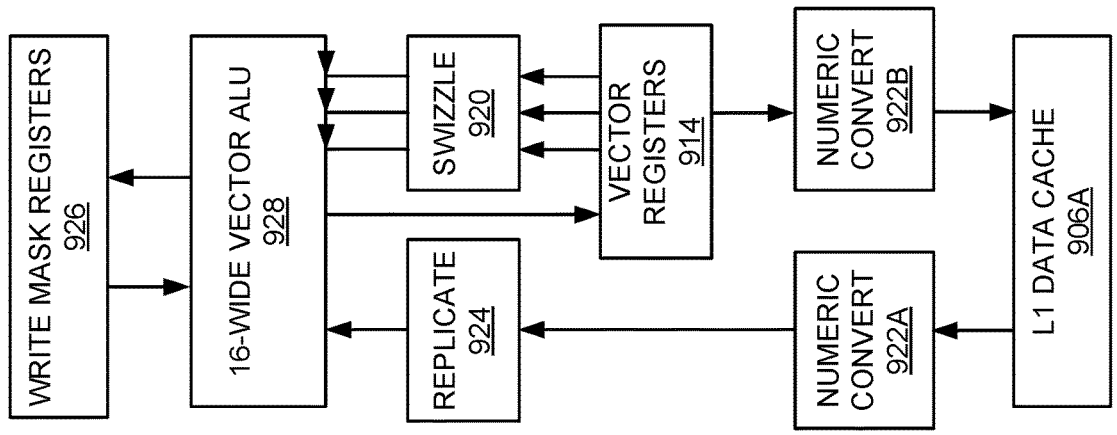
FIGS. 9A-B illustrate a block diagram of a more specific exemplary in-order core architecture, which core would be one of several logic blocks (including other cores of the same type and/or different types) in a chip.
Figure 9A:
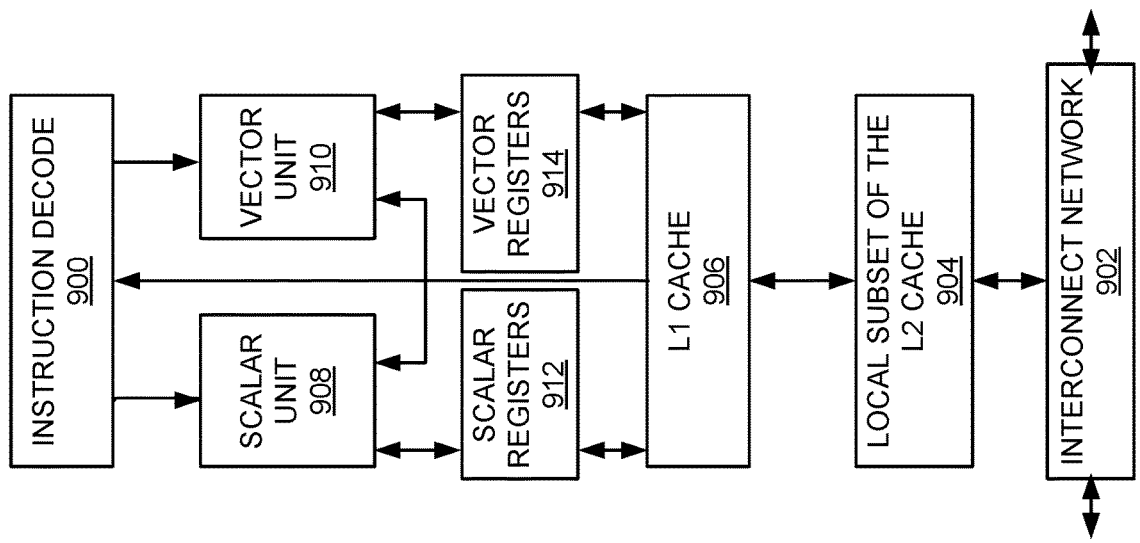

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to some embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to some embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
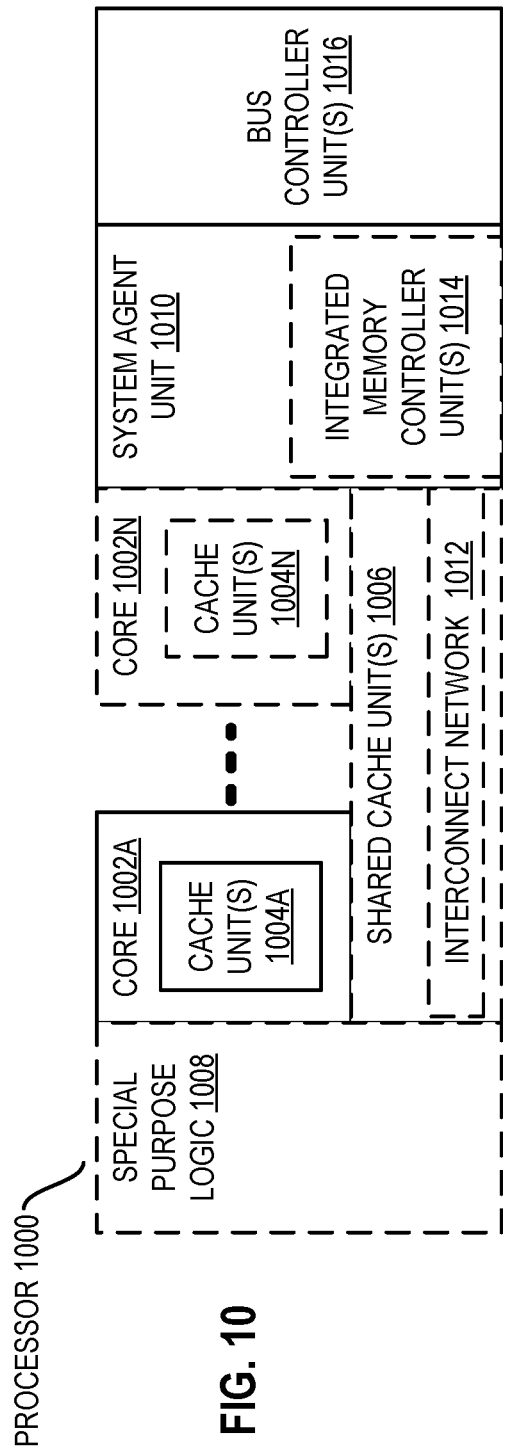
FIG. 10 is a block diagram of a processor that may have more than one core, may have an integrated memory controller, and may have integrated graphics according to some embodiments.

FIG. 10 is a block diagram of a processor 1000 that may have more than one core, may have an integrated memory controller, and may have integrated graphics according to some embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008 (integrated graphics logic 1008 is an example of and is also referred to herein as special purpose logic), the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
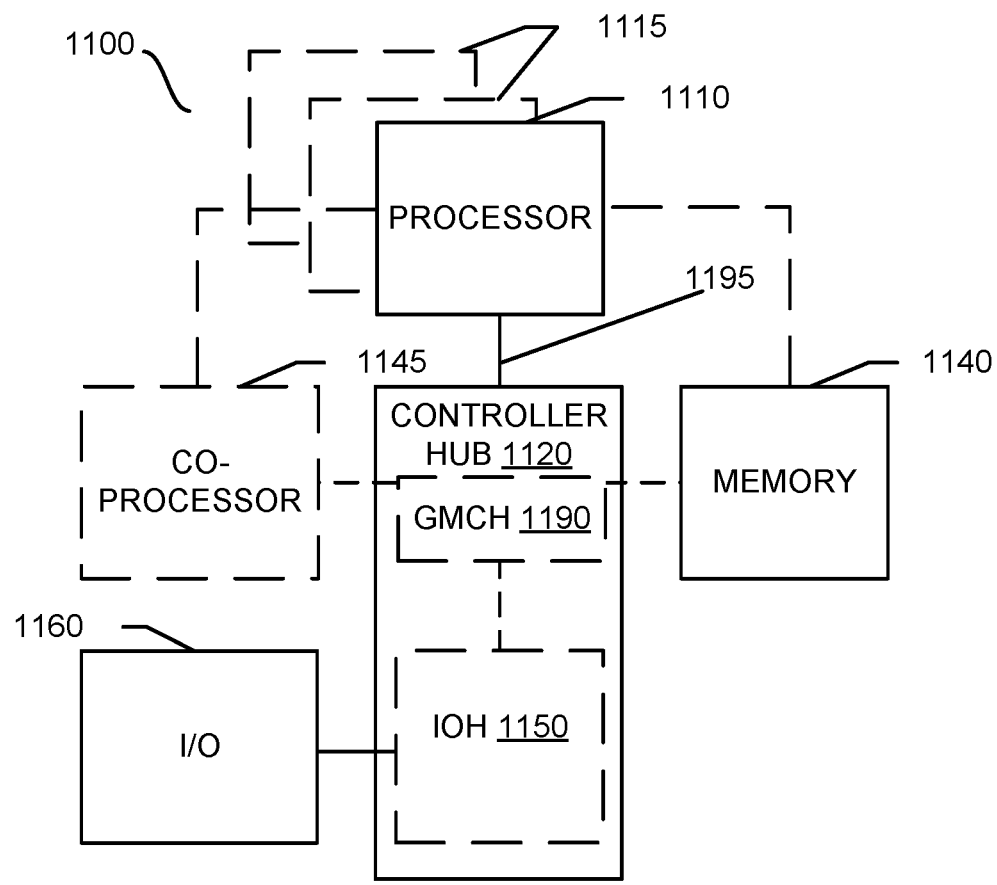
FIGS. 11-14 are block diagrams of exemplary computer architectures.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
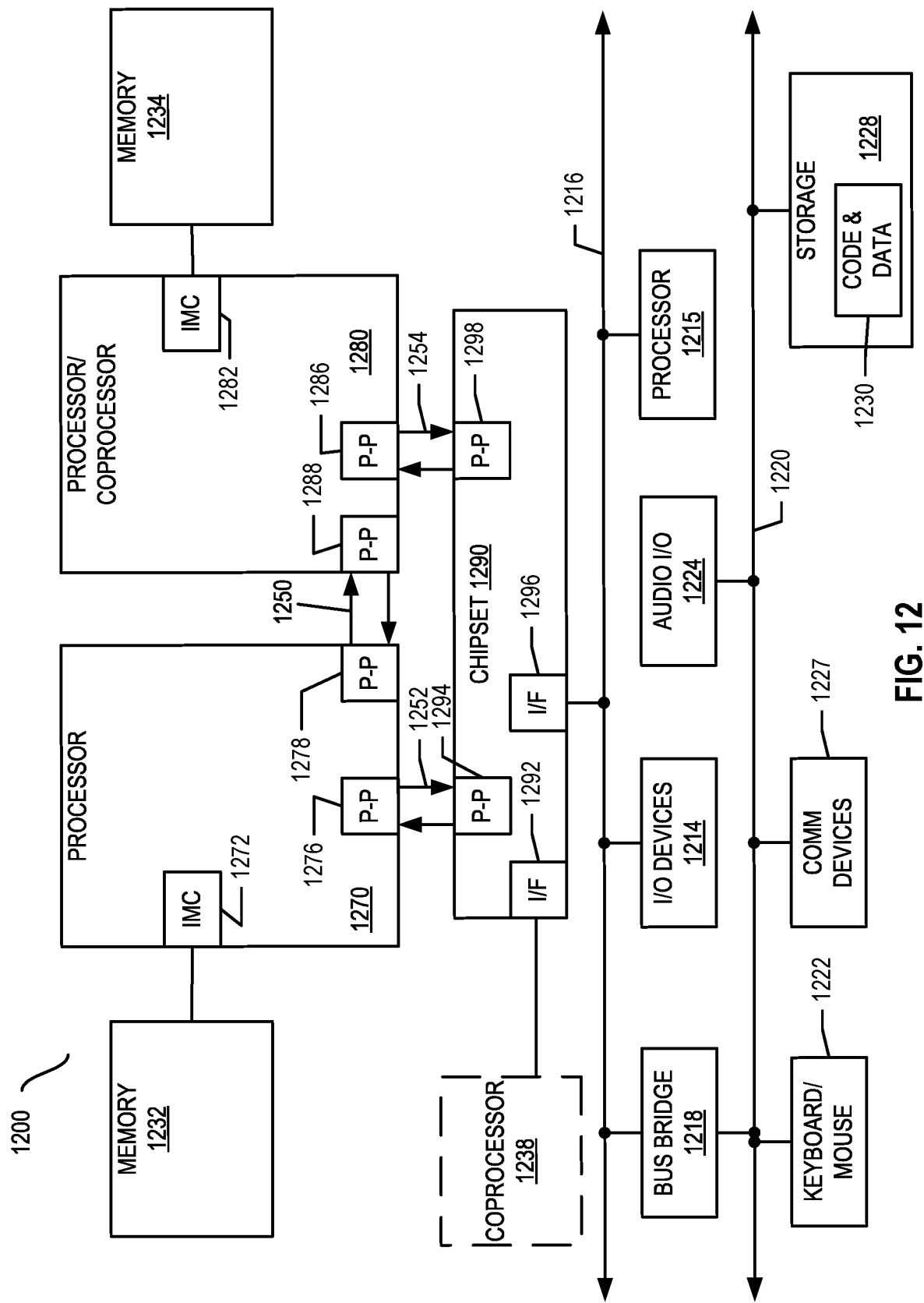

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In some embodiments, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1292. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
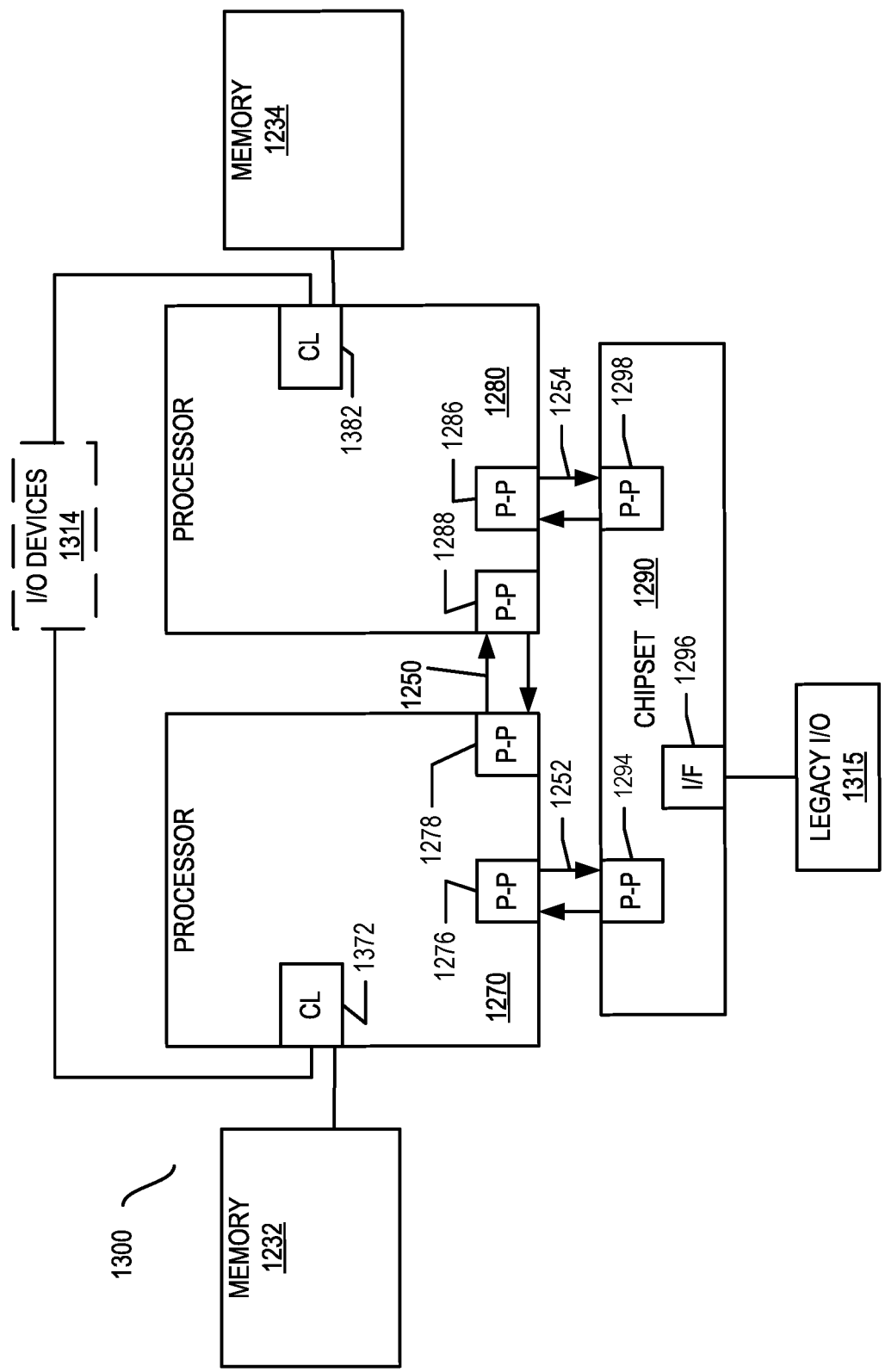

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1372 and 1282, respectively. Thus, the CL 1372, 1382 include integrated memory controller units and include I/O control logic. FIG. 13 illustrates that not only are the memories 1232, 1234 coupled to the CL 1372, 1382, but also that I/O devices 1314 are also coupled to the control logic 1372, 1382. Legacy I/O devices 1315 are coupled to the chipset 1290.

Figure 14:
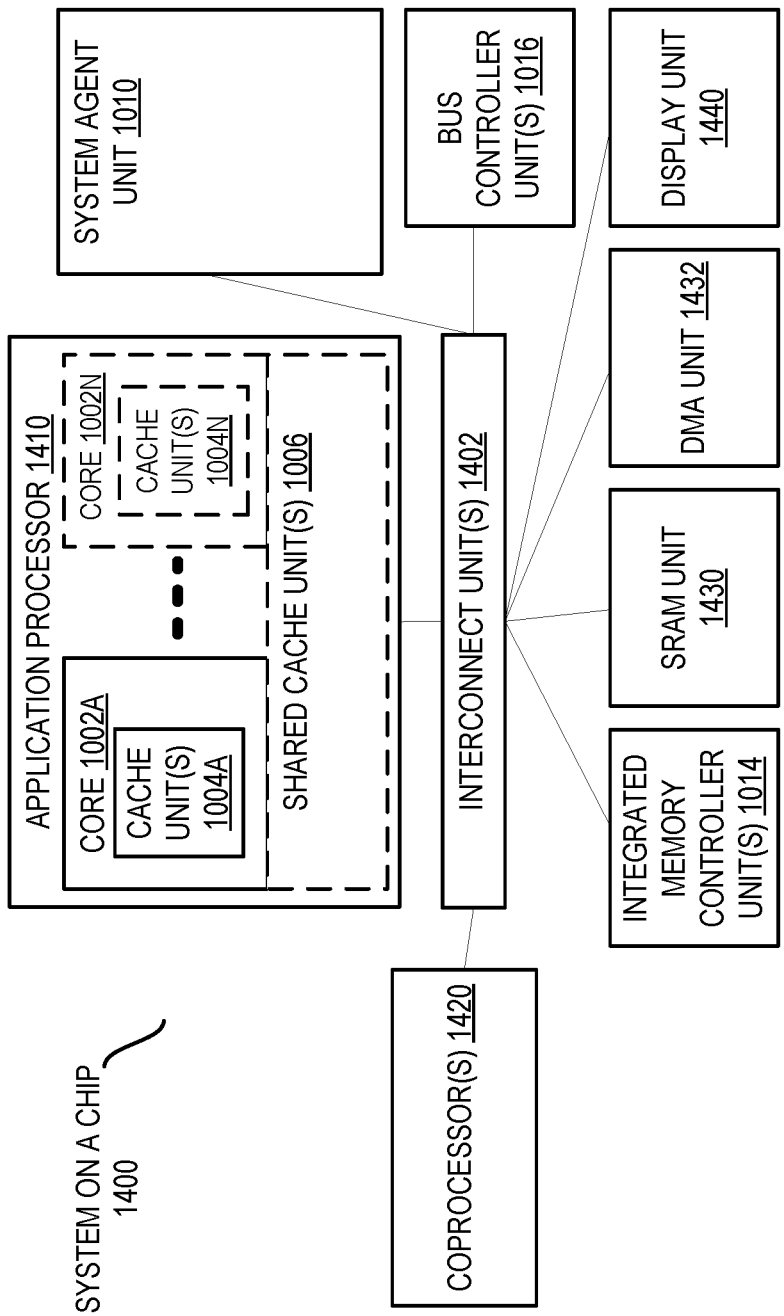

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 1002A-N, which include cache units 1004A-N, and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

FURTHER EXAMPLES

Example 1 provides a processor comprising a register file comprising a plurality of vector registers; a memory interface to receive read data from memory; fetch circuitry to fetch an instruction; decode circuitry to decode the fetched instruction having fields to specify an opcode, a destination vector register, and a memory location of a source vector comprising N groups of elements, N being a positive integer, the opcode to indicate the processor is to fetch the source vector, generate write data comprising one or more N-tuples, each N-tuple comprising corresponding elements from each of the N groups of elements, and write the write data to the destination vector register; and execution circuitry to execute the decoded instruction as per the opcode, wherein the execution circuitry has a shuffle pipeline disposed between the memory and the register file, the shuffle pipeline to fetch, decode, and execute further instances of the instruction at a rate of one instruction per clock cycle.

Example 2 includes the substance of the exemplary processor of Example 1, wherein the instruction further specifies a width of the source vector, the width being one of 32 bits, 64 bits, 128 bits, 256 bits, 512 bits, and 1,024 bits.

Example 3 includes the substance of the exemplary processor of Example 1, wherein the instruction further specifies a size of each element of the source vector, the size being one of 2 bits, 4 bits, 8 bits, 16 bits, 32 bits, 64 bits, and 128 bits.

Example 4 includes the substance of the exemplary processor of Example 1, wherein each of the N groups of elements of the source vector comprises M elements, wherein the destination vector register is wide enough to store N×M elements, and wherein the opcode further indicates the processor is to generate and write M tuples to corresponding elements of the destination vector register, each of the M tuples to comprise N corresponding elements of the N groups of elements.

Example 5 includes the substance of the exemplary processor of Example 1, wherein each of the N groups of elements of the source vector comprises M elements, wherein the instruction specifies M destination vector registers, and wherein the opcode further indicates the processor is to generate M N-tuples and broadcast each generated N-tuple to an entire width of one of the M destination vector registers.

Example 6 includes the substance of the exemplary processor of Example 1, wherein the N groups of elements of the source vector are contiguously arranged in the memory.

Example 7 includes the substance of the exemplary processor of Example 1, wherein the instruction further specifies one or more additional memory locations, such that a memory location is provided for each of the N groups of elements.

Example 8 includes the substance of the exemplary processor of Example 1, wherein each of the N groups of elements of the source vector comprises M elements, and wherein the opcode further indicates the processor is to generate and broadcast two N-tuples corresponding to two of the M elements of the source vector to the entire width of the destination vector register.

Example 9 includes the substance of the exemplary processor of Example 1, wherein the opcode is further to indicate the write data is to comprise a single tuple generated based on a selected element of the N source vectors, the single tuple to be broadcasted to the entire width of the destination vector register.

Example 10 includes the substance of the exemplary processor of Example 9, wherein the single tuple to be broadcasted is to be selected with an additional instruction field.

Example 11 provides a method to be performed by a processor comprising a memory interface to read data from memory, and a register file comprising a plurality of vector registers, the method comprising: fetching, using fetch circuitry, an instruction; decoding, using decode circuitry, the fetched instruction having fields to specify an opcode, a destination vector register, and a memory location of a source vector comprising N groups of elements, N being a positive integer, the opcode to indicate the processor is to fetch the source vector, generate write data comprising one or more N-tuples, each N-tuple comprising corresponding elements from each of the N groups of elements, and write the write data to the destination vector register; and executing, using execution circuitry, the decoded instruction as per the opcode, wherein the execution circuitry has a shuffle pipeline disposed between the memory and the register file, the shuffle pipeline to fetch, decode, and execute further instances of the instruction at a rate of one instruction per clock cycle.

Example 12 includes the substance of the exemplary method of Example 11, wherein the instruction further specifies a width of the source vector, the width being one of 32 bits, 64 bits, 128 bits, 256 bits, 512 bits, and 1,024 bits.

Example 13 includes the substance of the exemplary method of Example 11, wherein the instruction further specifies a size of each element of the source vector, the size being one of 2 bits, 4 bits, 8 bits, 16 bits, 32 bits, 64 bits, and 128 bits.

Example 14 includes the substance of the exemplary method of Example 11, wherein each of the N groups of elements of the source vector comprises M elements, wherein the destination vector register is wide enough to store N×M elements, and wherein the opcode further indicates the processor is to generate and write M tuples to corresponding elements of the destination vector register, each of the M tuples to comprise N corresponding elements of the N groups of elements.

Example 15 includes the substance of the exemplary method of Example 11, wherein each of the N groups of elements of the source vector comprises M elements, wherein the instruction specifies M destination vector registers, and wherein the opcode further indicates the processor is to generate M N-tuples and broadcast each generated N-tuple to an entire width of one of the M destination vector registers.

Example 16 includes the substance of the exemplary method of Example 11, wherein the N groups of elements of the source vector are contiguously arranged in the memory.

Example 17 includes the substance of the exemplary method of Example 11, wherein the instruction further specifies one or more additional memory locations, such that a memory location is provided for each of the N groups of elements.

Example 18 includes the substance of the exemplary method of Example 11, wherein each of the N groups of elements of the source vector comprises M elements, and wherein the opcode further indicates the processor is to generate and broadcast two N-tuples corresponding to two of the M elements to the entire width of the destination vector register.

Example 19 includes the substance of the exemplary method of Example 11, wherein the opcode is further to indicate the write data is to comprise a single tuple generated based on a selected element of the N source vectors, the single tuple to be broadcasted to the entire width of the destination vector register.

Example 20 includes the substance of the exemplary method of Example 19, wherein the single tuple to be broadcasted is to be selected with an additional instruction field.

Example 21 provides a non-transitory machine-readable medium containing instructions to which a processor comprising a memory interface to read data from memory and a register file comprising a plurality of vector registers is to respond by: fetching, using fetch circuitry, an instruction; decoding, using decode circuitry, the fetched instruction having fields to specify an opcode, a destination vector register, and a memory location of a source vector comprising N groups of elements, N being a positive integer, the opcode to indicate the processor is to fetch the source vector, generate write data comprising one or more N-tuples, each N-tuple comprising corresponding elements from each of the N groups of elements, and write the write data to the destination vector register; and executing, using execution circuitry, the decoded instruction as per the opcode, wherein the execution circuitry comprises a shuffle pipeline disposed between the memory and the register file, the shuffle pipeline to fetch, decode, and execute further instances of the instruction at a rate of one instruction per clock cycle.

Example 22 includes the substance of the exemplary non-transitory machine-readable medium of Example 21, wherein the instruction further specifies a width of the source vector, the width being one of 32 bits, 64 bits, 128 bits, 256 bits, 512 bits, and 1,024 bits.

Example 23 includes the substance of the exemplary non-transitory machine-readable medium of Example 21, wherein the instruction further specifies a size of each element of the source vector, the element size being one of 2 bits, 4 bits, 8 bits, 16 bits, 32 bits, 64 bits, and 128 bits.

Example 24 includes the substance of the exemplary non-transitory machine-readable medium of Example 21, wherein each of the N groups of elements of the source vector comprises M elements, wherein the destination vector register is wide enough to store N×M elements, and wherein the opcode further indicates the processor is to generate and write M tuples to corresponding elements of the destination vector register, each of the M tuples to comprise N corresponding elements of the N groups of elements.

Example 25 includes the substance of the exemplary non-transitory machine-readable medium of Example 21, wherein each of the N groups of elements of the source vector comprises M elements, wherein the instruction specifies M destination vector registers, and wherein the opcode further indicates the processor is to generate M N-tuples and broadcast each generated N-tuple to an entire width of one of the M destination vector registers.

What is claimed is:

1. A processor comprising:
a register file comprising a plurality of vector registers;
a memory interface to receive read data from memory;
fetch circuitry to fetch an instruction;
decode circuitry to decode the fetched instruction having fields to specify an opcode, a destination vector register, and a memory location of a source vector comprising N groups of elements, N being a positive integer greater than one, the opcode to indicate execution circuitry is to cause a shuffle pipeline disposed between the memory and the register file to fetch the source vector, generate write data comprising N-tuples, each N-tuple comprising corresponding elements from each of the N groups of elements, and write the write data to the destination vector register, wherein the opcode is further to indicate the write data is to comprise a single tuple generated based on a selected element of the N groups of elements, the single tuple to be selected with an additional instruction field and broadcasted to the entire width of the destination vector register; and
the execution circuitry to execute the decoded instruction as per the opcode.

2. The processor of claim 1, wherein the instruction further specifies a width of the source vector, the width being one of 32 bits, 64 bits, 128 bits, 256 bits, 512 bits, and 1,024 bits.

3. The processor of claim 1, wherein the instruction further specifies a size of each element of the source vector, the size being one of 2 bits, 4 bits, 8 bits, 16 bits, 32 bits, 64 bits, and 128 bits.

4. The processor of claim 1, wherein the N groups of elements of the source vector are contiguously arranged in the memory.

5. The processor of claim 1, wherein the instruction further specifies one or more additional memory locations, such that a memory location is provided for each of the N groups of elements.

6. A method to be performed by a processor comprising a memory interface to read data from memory, and a register file comprising a plurality of vector registers, the method comprising:
fetching, using fetch circuitry, an instruction;
decoding, using decode circuitry, the fetched instruction having fields to specify an opcode, a destination vector register, and a memory location of a source vector comprising N groups of elements, N being a positive integer greater than one, the opcode to indicate execution circuitry is to cause a shuffle pipeline disposed between the memory and the register file to fetch the source vector, generate write data comprising N-tuples, each N-tuple comprising corresponding elements from each of the N groups of elements, and write the write data to the destination vector register, wherein the opcode is further to indicate the write data is to comprise a single tuple generated based on a selected element of the N groups of elements, the single tuple to be selected with an additional instruction field and broadcasted to the entire width of the destination vector register; and
executing, using the execution circuitry, the decoded instruction as per the opcode.

7. The method of claim 6, wherein the instruction further specifies a width of the source vector, the width being one of 32 bits, 64 bits, 128 bits, 256 bits, 512 bits, and 1,024 bits.

8. The method of claim 6, wherein the instruction further specifies a size of each element of the source vector, the size being one of 2 bits, 4 bits, 8 bits, 16 bits, 32 bits, 64 bits, and 128 bits.

9. The method of claim 6, wherein the N groups of elements of the source vector are contiguously arranged in the memory.

10. The method of claim 6, wherein the instruction further specifies one or more additional memory locations, such that a memory location is provided for each of the N groups of elements.

11. A non-transitory machine-readable medium containing code to which a processor comprising a memory interface to read data from memory and a register file comprising a plurality of vector registers is to respond by:
fetching, using fetch circuitry, an instruction;
decoding, using decode circuitry, the fetched instruction having fields to specify an opcode, a destination vector register, and a memory location of a source vector comprising N groups of elements, N being a positive integer greater than one, the opcode to indicate execution circuitry is to cause a shuffle pipeline disposed between the memory and the register file to fetch the source vector, generate write data comprising N tuples, each N-tuple comprising corresponding elements from each of the N groups of elements, and write the write data to the destination vector register, wherein the opcode is further to indicate the write data is to comprise a single tuple generated based on a selected element of the N groups of elements, the single tuple to be selected with an additional instruction field and broadcasted to the entire width of the destination vector register; and
executing, using the execution circuitry, the decoded instruction as per the opcode.

12. The non-transitory machine-readable medium of claim 11, wherein the instruction further specifies a width of the source vector, the width being one of 32 bits, 64 bits, 128 bits, 256 bits, 512 bits, and 1,024 bits.

13. The non-transitory machine-readable medium of claim 11, wherein the instruction further specifies a size of each element of the source vector, the element size being one of 2 bits, 4 bits, 8 bits, 16 bits, 32 bits, 64 bits, and 128 bits.

14. The non-transitory machine-readable medium of claim 11, wherein the N groups of elements of the source vector are contiguously arranged in the memory.

15. The non-transitory machine-readable medium of claim 11, wherein the instruction further specifies one or more additional memory locations, such that a memory location is provided for each of the N groups of elements.

* * * * *